US 12,192,344 B2

United States Patent
Ganguly et al.

(10) Patent No.: US 12,192,344 B2
(45) Date of Patent: Jan. 7, 2025

(54) SYSTEMS AND METHODS FOR PROVIDING DYNAMIC QUANTUM CLOUD SECURITY THROUGH ENTANGLED PARTICLE DISTRIBUTION

(71) Applicant: Cisco Technology, Inc., San Jose, CA (US)

(72) Inventors: Santanu Ganguly, Ashford (GB); D. Brice Achkir, Livermore, CA (US)

(73) Assignee: Cisco Technology, Inc., San Jose, CA (US)

( * ) Notice: Subject to any disclaimer, the term of this patent is extended or adjusted under 35 U.S.C. 154(b) by 301 days.

(21) Appl. No.: 17/899,133

(22) Filed: Aug. 30, 2022

(65) Prior Publication Data
US 2024/0073010 A1    Feb. 29, 2024

(51) Int. Cl.
*H04L 9/08* (2006.01)
*G06N 10/00* (2022.01)
(Continued)

(52) U.S. Cl.
CPC .......... *H04L 9/0852* (2013.01); *G06N 10/00* (2019.01); *G06N 10/20* (2022.01); *H04L 63/083* (2013.01)

(58) Field of Classification Search
CPC ..... H04L 9/0852; H04L 63/083; G06N 10/20; G06N 10/00
See application file for complete search history.

(56) References Cited

U.S. PATENT DOCUMENTS

| 9,264,226 B2 * | 2/2016 | Harrison | G06N 10/00 |
| 2013/0208894 A1 * | 8/2013 | Bovino | H04L 9/0852 380/278 |

(Continued)

FOREIGN PATENT DOCUMENTS

| CN | 104883304 A | * | 9/2015 | ............. H04L 45/02 |
| CN | 106452751 A | * | 2/2017 | ........... H04L 9/0855 |

(Continued)

OTHER PUBLICATIONS

Tann, "Quantum Remote Entanglement for Medium-Free Secure Communication," arXiv.org, Feb. 2, 2022, pp. 1-15.
(Continued)

*Primary Examiner* — Richard G Keehn
(74) *Attorney, Agent, or Firm* — Polsinelli P.C.

(57) ABSTRACT

Disclosed is a method of establishing secure communications between nodes in a cloud environment. The method includes receiving a log-in of a first user, receiving a log-in of a second user and presenting to the first user one or more options to use a secure inter-user communication security service leveraging quantum teleportation in order to communication with the second user, wherein the secure inter-user communication security service optionally uses a quantum EPR processor (QEP). The one or more options include applying the secure inter-user communication security service using QEP to generate EPR Bell state pairs and applying security via quantum teleportation for communications between the first user and the second user and applying the secure inter-user communication security service to securely control communication between a first container associated with the first user and a second container associated with the second user and associated daemons leveraging the QEP.

20 Claims, 12 Drawing Sheets

(51) Int. Cl.
    *G06N 10/20* (2022.01)
    *H04L 9/40* (2022.01)

(56) References Cited

U.S. PATENT DOCUMENTS

| | | | |
|---|---|---|---|
| 2021/0142205 A1* | 5/2021 | Ashrafi | G06N 10/00 |
| 2021/0142206 A1* | 5/2021 | Ghanea-Hercock | G06F 21/602 |
| 2021/0175976 A1* | 6/2021 | Rahman | H04L 9/0855 |
| 2021/0176055 A1* | 6/2021 | Rahman | G06N 10/00 |
| 2022/0166773 A1* | 5/2022 | Trost | G06N 10/00 |
| 2022/0215279 A1* | 7/2022 | Rahman | G06N 10/00 |
| 2022/0269976 A1* | 8/2022 | Wang | G06N 10/00 |

FOREIGN PATENT DOCUMENTS

| | | | |
|---|---|---|---|
| CN | 109982410 A | * | 7/2019 |
| EP | 3340494 | | 6/2018 |

OTHER PUBLICATIONS

Singh et al., "Quantum Internet—Applications, Functionalities, Enabling Technologies, Challenges, and Research Directions," IEEE, vol. 23, No. 4., 2021, pp. 1-30.

* cited by examiner

Algorithm: Bell pair Distribution in a Network Leveraging Teleportation

Consider a network with N-nodes. Alice initializes the $i^{th}$ node to start off the process. Initial state is $S_i$. Bob's node is $j^{th}$ node given by $D_j$. Network edges are given by $e$. $w$ is the weight of an edge. $w$ is the number of entangled particles connecting node $i$ to node $j$.

| | | |
|---|---|---|
| Initialize | 1 | Alice at $S_i$ sends out a Route Request (RREQ). The RREQ packet contains the entanglement request connecting $i$ to node $j$. |
| repeat | 2 | for all jobs $k = (1,2,..., N)$ do |
| | 3 | $S_i$ (Alice) wishes to transmit $|B_j\rangle$ to Bob at node $D_j$ |
| | 4 | message received and forwarded by next hop node $i$. |
| | 5 | next hops and neighbours produce reverse routing tables and record path to source $S_i$ |
| | 6 | neighbours add remaining EPR Bell pairs numbers on an "EPR available" list and assign a serial number |
| | 7 | end for |
| | 8 | if $w \neq 0$, then |
| | 9 | teleport qubit info to $D_j$ from $S_i$ |
| | 10 | else if $w \neq 0$, then |
| | 11 | $S_i$ sends out an RREQ to initiate an entangled channel connecting nodes $i$ to $j$. |
| | 12 | Teleport qubit information from nodes $i$ to $j$. |
| | 13 | end if |
| | 14 | $w = w-1$ |
| End | 15 | till finish |

FIG. 4

| Algorithm: Probabilistic Cloning assisted Entanglement Distribution of Separable States for Teleportation |
|---|
| In a network with N-nodes, Alice prepares 2N-qubits. <br> The 2N qubits prepared by Alice are all randomly in one of the following states: $|00\rangle, |11\rangle, |\beta_{00}\rangle, |\beta_{10}\rangle$. <br> Alice initializes the $i^{th}$ node to start off the process. Initial sequence sent by Alice at source node $S_1$ is $\sigma_i$. <br> Bob's node is the $j^{th}$ node given by $D_j$. Network edges are given by $e$. $w$ is the number of entangled particles connecting node $i$ to node $j$. |

| Initialize | 1 | Alice at $S_1$ sends sequence $\sigma_i$ as a Route Request (RREQ) . The RREQ packet contains the entanglement request connecting $i$ to node $j$. |
|---|---|---|
| repeat | 2 | for all jobs $k = (1,2,..., N)$ do |
| | 3 | $S_1$ (Alice) wishes to transmit sequence to $\sigma_i$ Bob at node $D_j$ |
| | 4 | message received and forwarded by next hop node $l$. |
| | 5 | next hops and neighbours produce reverse routing tables and record path to source $S_1$ |
| | 6 | neighbours add remaining EPR Bell pairs numbers on an "EPR available" list and assign a serial number |
| | 7 | end for |
| | 8 | if $w \neq 0$, then |
| | 9 | teleport qubit info to $D_j$ from $S_1$ |
| | 10 | else if $w = 0$, then |
| | 11 | $S_1$ sends out an RREQ to initiate an entangled channel connecting nodes $i$ to $j$. |
| | 12 | Teleport qubit information from nodes $i$ to $j$ |
| | 13 | end if |
| | 14 | $w = w - 1$ |
| | 15 | Bob at $D_1$ receives the sequence $\sigma_i$ and verifies it for security by measuring each qubit randomly in Bell or Z-basis |
| | 16 | Bob announces positions of these verification pairs and requests Alice to announce her prepared state |
| | 17 | If the prepared and measurement basis are different with probability $\leq 0.5$ then Bob cannot verify Alice |
| | 18 | Then abort protocol |
| | 19 | If the prepared and measurement basis are the same then authenticity of Alice is verified |
| | 20 | Then continue with protocol |
| | 21 | If error rate is higher than predetermined error rate indicating eavesdropping |
| | 22 | Then abort protocol |
| | 23 | else destroy initial entanglement pair and continue protocol |
| | 24 | Bob records the results of measurements done on each qubit randomly in Bell or Z-basis <br> For the qubits in $i$-th position measured in Z-basis, the key value for the $i$-th position is recorded as $0$. <br> For the qubits in $i$-th position measured in Bell-basis, the key value for the $i$-th position is recorded as $1$. |
| | 25 | Bob generates a binary string $qkey_{Bob} = \{0,1\}^N$ <br> For each key bob announces a "$0$" or a "$1$". |
| | 26 | At this stage, Bob now knows the whole raw key. |
| | 27 | Alice knows $1/4^{th}$ of the raw key given by $qkey_{Alice1}$ |

FIG. 6

| 28 | Alice tells Bob the qubit position and key value corresponding to $qkey_{Alice1}$ |
| 29 | If the corresponding qubit position of Bob given by $qkey_{Bob1} = qkey_{Alice1}$ |
|    | Then Bob authenticates Alice |
|    | else Bob to Alice protocol is cancelled |
| 30 | The final length of the key is given $kN$, where the key has $k$-parts with length $N$ for each. |
| 31 | Bob and Alice break up the key into $k$-parts bitwise in a classical post-processing step. |
| 32 | Bob knows the whole key, Alice knows part of it but if she wants to know the $n$-th term in the database, then, she announces a shift value of $s = n - i$ |
| 33 | Bob shifts his final key by $s$ |
|    | Bob decrypts the entire information and sends it to Alice. |
|    | Bob at $D_1$ sends measured sequence $\sigma_{Bobi}$ to Alice |
| 34 | Alice at $S_1$ receives the sequence $\sigma_{Bobi}$ and verifies it for security by measuring each qubit randomly in Bell or Z-basis |
| 35 | Alice announces positions of these verification pairs and requests Bob to announce her prepared state |
| 36 | If the prepared and measurement basis are different with probability ≤ 0.5 then Alice cannot verify Bob |
| 37 | Then abort protocol |
| 38 | If the prepared and measurement basis are the same then authenticity of Bob is verified |
| 39 | Then continue with protocol |
| 40 | If error rate is higher than predetermined error rate indicating eavesdropping |
| 41 | Then abort protocol |
| 42 | else destroy initial entanglement pair and continue protocol |
| 43 |  |
| 44 | Alice records the results of measurements done on each qubit randomly in Bell or Z-basis as per rules agreed with Bob in step 24 |
|    | For the qubits in $i$-th position measured in Z-basis, the key value for the $i$-th position is recorded as $0$. |
| 45 | For the qubits in $i$-th position measured in Bell-basis, the key value for the $i$-th position is recorded as $1$. |
|    | Alice encodes the measured qubits to generate a new $qkey_{Alice2}$ |
| 46 | Bob announces key $qkey_{Bob2}$ |
| 47 | If the corresponding qubit position of Bob given by $qkey_{Bob2} = qkey_{Alice2}$ |
| 48 | Then Alice authenticates Bob |
| 49 | else Alice to Bob protocol is cancelled |
| 50 |  |
|    | Alice performs measurement on remaining Bell state qubits at Bell-basis |
|    | Alice obtains key $qkey_{Alice3}$ as per rules agreed with Bob in step 24 |
| 51 | Alice produces a new key as per receiving sequence of $\sigma_{Bobi}$ by combining the existing keys: $qkey_{Alice} = qkey_{Alice1} + qkey_{Alice2} + qkey_{Alice3}$ |
|    | At this point in time, if all other steps were successful for protocol continuation, |
| 52 | then $qkey_{Alice} = qkey_{Bob}$ |
| 53 | The entanglement driven Quantum Key Distribution is now complete |
| End | 54 till finish |

FIG. 6 *(Continued)*

SYSTEMS AND METHODS FOR PROVIDING DYNAMIC QUANTUM CLOUD SECURITY THROUGH ENTANGLED PARTICLE DISTRIBUTION

TECHNICAL FIELD

This disclosure relates generally to quantum entanglement and quantum teleportation and also to an architecture for secure quantum key management and distribution via routing.

BACKGROUND

Modern cryptography algorithms are based on the fundamental process of factoring large integers into their primes, which is said to be intractable. But modern cryptography is vulnerable to both technological progress of quantum computing power and evolution in mathematics to quickly reverse one-way functions such as that of factoring large integers. One of the ways to mitigate this threat is quantum key distribution (QKD).

However, large scale industrial implementation of QRNG (quantum random number generator)-based QKD still faces several challenges such as secret key rate, distance, size, cost and practical security. The threat of the speed of factorization by near-term quantum computing platform is now considered real.

The main cryptographic protocols used today to secure the Internet and the vital services accessed across the Internet, such as financial transactions, are all susceptible to attack by the development of a sufficiently large and efficient quantum computer.

In case of classical computation, the complexity of searching in an unstructured data set of size n is O(n), e.g., in the worst possible case is high because all the records will need to be inspected. The well-known Grover's algorithm allows to solve this problem in $O(\sqrt{n})$, steps. This essentially means that, if a user has 40 bits and needs to find a combination that satisfies certain condition, then in the classical case, the user needs to process approximately $10^{12}$ different combinations, whereas the quantum algorithm will yield a result in about $10^6$ queries.

Rather than depending on the complexity of factoring large numbers, quantum cryptography is based on the fundamental and unchanging principles of quantum mechanics, upon which the efficient Shor's algorithm is based. Shor's algorithm is a polynomial-time quantum computer algorithm for integer factorization.

Several industry leaders and financial institutions have started testing quantum computing as an option for their future production network. HSBC, Barclay's bank, Volkswagen in enterprise space and NASA, governments of US and China are well known names who have engaged in developing applications based on various quantum technologies in computing space in recent years. Notable quantum computing vendors today are Google, IBM Q, Rigetti, Xanadu, D-Wave Systems, Ali Baba, etc. However, much of the access that users have to public cloud environments is not as secure as it should be.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 4 illustrates an algorithm for EPR (Einstein, Podolsky and Rosen) pair routing, according to some aspects of this disclosure;

FIG. 6 illustrates an algorithm for entanglement distribution with separable states, according to some aspects of this disclosure;

DETAILED DESCRIPTION

Figure 1:
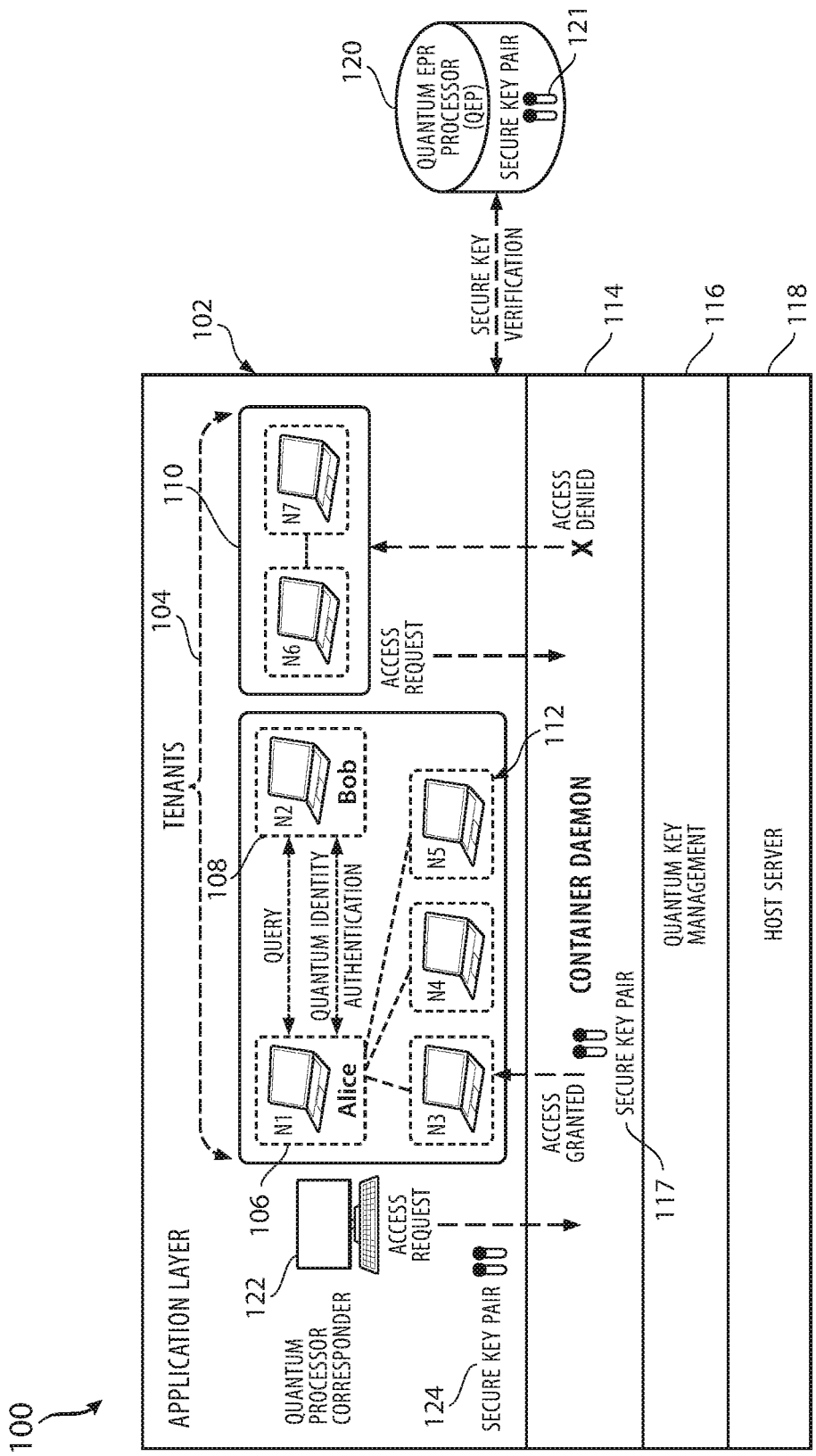
FIG. 1 illustrates the concept of security leveraging quantum teleportation, according to some aspects of this disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

OVERVIEW

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

In order to counter the threat to security in a cloud environment, a mechanism is needed to tighten security for communication from threats of post-quantum attacks. A major challenge of leveraging quantum key distribution in cloud is to design a secure key agreement between two users via a quantum key management service, which can be managed by a Cloud Service Provider (CSP) in this scenario. This disclosure focuses on how to provide a new approach to providing a more secure service to users of cloud environments. As part of the service, the necessary hardware is made available to users of the cloud to be able to receive quantum particles.

There are users, for example, in defense and finance industry who may require additional private security after being authenticated in the cloud environment. The following proposal involves replacing the current day public key cryptography with a variety of quantum algorithms.

Financial and federal government entities are demanding solutions for quantum safe communication not only in a point-to-point scenario where quantum key distribution (QKD) and/or Cisco SKIP (Secure Key Import Protocol) can be used either separately or in tandem, but also when they access the public cloud. Quantum attack secure communication in a cloud-based infrastructure has become a mandatory business critical security challenge.

A major challenge of leveraging quantum key distribution in cloud has been the design of a secure authentication agreement between two users in the CSP-governed scenario. There are users, for example, in defense, federal governments and financial industry who may require additional private security after being authenticated in the cloud environment.

This disclosure addresses architecture of the following offerings: 1) Users who require tightening of security in a cloud environment that can leverage a distributed entanglement-based service with separable states. 2) The disclosure defines an architecture of inter-user querying and inter-user further authentication before establishing trust. 3) The disclosure provides an algorithm which covers the entanglement distribution process in point 1). 4) The same algorithm in point 3) addresses the inter-user trust establishment. Note that in one aspect, the use of a secure key pair or multiple secure key pairs generated by a quantum entanglement processor can be used first for user identification/authentication and then separately for secure communications between containers associated with different users or processes that desire to communicate, for example, between users in the military. The communication might only require one secure key pair or may require multiple secure key pairs if it is intermittent.

There are challenges with respect to how the current state of the art leverages or avoids the issue of quantum entanglement or quantum processes. Currently, cloud security does not take into account quantum attacks. Entanglement or providing entangled pairs of particles is produced by a global operation in the systems that use the entangled particles, or as a result of a direct transmission of entangled particles between the systems. In the use of entanglement distribution with separable states, the disclosure assumes that quantum correlation is not easily affected by channel noise, which can be unrealistic and therefore the protocol disclosed herein utilizes the quantum distillation technology to ensure/offer robustness.

With respect to open and closed quantum systems, the prior art related to quantum networking via entanglement are based on the transmission of pure quantum states and do not consider noise during transmission. However, in reality, every quantum system interacts with its environment, the idealization of an isolated, closed quantum system obeying perfectly unitary quantum dynamics is an idealization. Realistically, every quantum system is coupled to an external environment and even a quantum system in an initial "pure state" will interact with its environment and evolve into a mixed state thereby creating noise which will cause loss in fidelity and decoherence. Hence, the prior entanglement-based quantum network communications show acceptable results only theoretically—in practice it is not possible to attain such accuracy.

The following disclosure includes differences between the current state of the art and includes providing entanglement distribution with separable states with probabilistic cloning. This disclosure outlines an improvement upon the current state of the art in the following main ways. The new concepts combine entanglement distribution with separable states with probabilistic cloning to derive a quantum network communication operation. The disclosure employs separable states for entanglement distribution with probabilistic cloning that offers an improvement in terms of noise mitigation and fidelity. The quantum network communication builds on forming a quantum teleportation channel between source and destination via transmission of intermediate quantum states. Furthermore, the process may or may not involve classical information exchange. One example of how a classical channel would not be needed can be where a security token can be attached to a request (or to the generated secure key pair) for quantum teleportation and once the security token (an ancilla or additional qubit) is passed from hop to hop through the network, it can be discarded at a destination node and there is no need for a separate classical channel. Thus, in one aspect of this disclosure, there is one and only one quantum channel and no other classical channel.

In other aspects, a classical channel might be employed to pass information associated with the secure communication channels arranged according to this disclosure.

A butterfly network topology is adopted and enhanced by an n-qubit entanglement of which a GHZ (Greenberger-Horne-Zeilinger) state entanglement is an example. Probabilistic cloning properties of quantum states is also applied to this same state. The basic properties of GHZ states have been part of quantum information studies and are used herein in conjunction with the butterfly topology. In some cases, experts have only recommended an algorithm for resource control of entangled Bell pairs but none for identity authentication, query for actual quantum key distribution in an entangled environment. The Bell pairs are specific quantum states of two qubits that represent the simplest examples of quantum entanglement. The Bell states are a form of entangled and normalized basis vectors. The normalization implies that the overall probability of the particle being in one of the two different states is 1. Entanglement is a basis-independent result of superposition. Due to this superposition, measurement of the qubit will "collapse" it into one of its basis states with a given probability. Because of the entanglement, measurement of one qubit will "collapse" the other qubit to a state whose measurement will yield one of two possible values, where the value depends on which Bell state the two qubits are in initially. Bell states can be generalized to certain quantum states of multi-qubit systems, such as the GHZ state for 3 or more subsystems. This disclosure offers an algorithm to address the authentication and query in combination with key distribution logic.

An example method of this disclosure includes receiving a log-in of a first user into a cloud environment using a classical authentication process, receiving a log-in of a second user in the cloud environment using the classical authentication process and presenting to the first user one or more options to use a secure inter-user communication security service leveraging quantum teleportation in order to communication with the second user in the cloud environment. The secure inter-user communication security service can optionally use a quantum EPR (Einstein Podolsky and Rosen) processor (QEP). The one or more options can include a first option of applying the secure inter-user communication security service, a second option of applying the secure inter-user communication security service using QEP to generate EPR Bell state pairs and applying; robust additional security via quantum teleportation for communications between the first user and the second user within the cloud environment and a third option of applying the secure inter-user communication security service to securely control communication between a first container associated with the first user and a second container associated with the second user and running on the cloud environment and associated daemons leveraging the QEP. The process can include in one aspect only a secure quantum channel and not a separate classical communication channel. However, in other aspects of this disclosure, a classical communication channel can be used as part of the process as well.

Applying the robust additional security via quantum teleportation for communications between containers or processes associated with the first user and the second user within the cloud environment further can include implementing a query process from the first user to the second user for quantum key distribution of a secure key pair generated by the QEP and implementing an identify authentication process between the first user and the second user using the secure key pair generated by the QEP. This enables both user authentication and then secure communication between users in the cloud environment.

A system can include a processor and a computer-readable storage device storing instructions which, when executed by the processor, causes the processor to perform operations including one or more of receiving a log-in of a first user into a cloud environment using a classical authentication process, receiving a log-in of a second user in the cloud environment using the classical authentication process and presenting to the first user one or more options to use a secure inter-user communication security service leveraging quantum teleportation in order to communication with the second user in the cloud environment. The secure inter-user communication security service optionally uses a quantum EPR processor (QEP). The one or more options can include a first option of applying the secure inter-user communication security service, a second option of applying the secure inter-user communication security service using QEP to generate EPR Bell state pairs and applying robust additional security via quantum teleportation for communications between the first user and the second user within the cloud environment and a third option of applying the secure inter-user communication security service to securely control communication between a first container associated with the first user and a second container associated with the second user and running on the cloud environment and associated daemons leveraging the QEP. While Bell state pairs are referenced other entangled particles could be used as well and this disclosure is not limited strictly to Bell state pairs.

Another method example can include one or more steps of receiving a route request from a first user for establishing an entangled channel between a first node associated with the first user with a second node associated with a second user, forwarding the route request to a node in a network, performing, at the node in the network, a routing lookup and generating a routing table associated with the first node to record a path to the first node and teleporting qubit information to the source node. The teleporting of qubit information to the source node can use a probabilistic cloning-assisted entanglement distribution of separable states. The method further can include teleporting second qubit information from the first node to the second node. Teleporting the qubit information to the source node can be further achieved using a butterfly topology, wherein the butterfly topology is boosted with Greenberger-Horne-Zeilinger state entanglement and probabilistic cloning properties of quantum states.

In quantum computing, a qubit or quantum bit is the basic unit of quantum information. It can be compared to a quantum version of the classic binary bit (a 0 or a 1) physically realized with a two-state device. A qubit is a two-state (or two-level) quantum-mechanical system, one of the simplest quantum systems displaying the peculiarity of quantum mechanics. Examples include the spin of an electron in which the two levels can be taken as spin up and spin down; or the polarization of a single photon in which the two states can be taken to be the vertical polarization and the horizontal polarization. In a classical system, a bit would have to be in one state or the other and would be characterized or assigned a 0 or a 1. However, quantum mechanics allows the qubit to be in a coherent superposition of both states simultaneously, a property that is fundamental to quantum mechanics and quantum computing. This disclosure, when it references a qubit, can mean any quantum bit which uses any state information in its superposition of states.

In this aspect, the method further can include implementing a query process from the first user to the second user for quantum key distribution of a secure key pair generated by a quantum EPR processor (QEP) and implementing an identify authentication process between the first user and the second user using the secure key pair generated by the QEP.

DESCRIPTION OF EXAMPLE EMBODIMENTS

Disclosed herein are systems, methods, and computer-readable media for innovations which focus on the ability to improve the security of communications in a cloud environment using quantum mechanics. With the rise of cloud adoption in enterprise, financial industries and governments, the security of communication with and within a cloud infrastructure has become paramount. In order to use cloud services a client needs to provide a ticket or a token which, for a cloud service, is a series of bits enciphered using a private key for the same cloud service. This disclosure addresses that challenge and proposes a quantum key and entanglement enhanced model for quantum enhanced security of a cloud infrastructure. Two quantum enhanced security measures are offered as services: a hybrid classical-quantum method of Kerberos tightened with quantum key distribution (QKD) for cloud authentication and quantum teleportation-based security to enhance the same. The disclosure also includes a routing algorithm for distribution of the relevant quantum keys.

Kerberos refers to a computer-network authentication protocol that works on the basis of tickets to allow nodes communicating over a non-secure network to prove their identity to one another in a secure manner. Kerberos protocol messages are protected against eavesdropping and replay attacks. Kerberos builds on symmetric-key cryptography and requires a trusted third party, and optionally may use public-key cryptography during certain phases of authentication. Kerberos uses UDP (User Datagram Protocol) port 88 by default. Those of skill in the art will understand the Kerberos protocol and how to implement it.

The disclosure provides an architecture for the following offerings. First, the disclosure addresses users who require tightening of security in a cloud environment to leverage a distributed entanglement-based service with separable states. The disclosure defines an architecture of inter-user querying and inter-user further authentication before establishing trust. The disclosure introduces an algorithm which covers the entanglement distribution process introduced above. The same algorithm addresses the inter-user trust establishment.

The disclosure in one aspect utilizes quantum encryption through applying a Kerberos-based model in a hybrid quantum-classical architecture. The architecture enables quantum enhanced secure communication between users in a cloud environment. Users are offered quantum enhanced security measures as services as follows: First, the users log in to their cloud environment in their usual way through an existing classical authentication process. Once the users authenticate and log in to their cloud environment, they are offered the option of using a higher form of inter-user communication security leveraging quantum teleportation. This "as-a-Service" option consists of offering the customers choices including a first choice of using Quantum SeCurity as a service (QSeCaaS) for communication between users on the cloud with the help of a server which is referred to as Quantum EPR Processor (QEP). The QEP concept consists of a quantum state generating server which acts as a source of EPR Bell state pairs and offering robust additional security via quantum teleportation.

A second choice consists of offering the customers, once they are authenticated and logged, Quantum SeCurity as a service (QSeCaaS) to securely control communication between users of the cloud services at different locations. The combination of these steps, as a service offering, are novel and part of the focus of this disclosure.

A third choice consists of offering the customers Quantum SeCurity as a service (QSeCaaS) to securely control communication between containers running on cloud and associated daemons leveraging a server such as the QEP. In the instance of a container platform, the daemon itself can act as an attack surface. Activating and running of the container daemon is not directly related to root privileges. In case an unauthorized access to the daemon is managed, then root access compromising the entire environment and system can be achieved by a rogue element. This approach is adapted from the SwissQuantum field test. The technology used for this step is quantum teleportation and usage of a quantum processor server (QEP). Note that the SwissQuantum quantum key distribution network was used for several years and was used to test the reliability of the quantum layer over a long period of time in a production environment. See Stucki et al., Long-term performance of the SwissQuantum quantum key distribution network in a field environment, New Journal of Physics, Vol. 13, December 2011, incorporated herein by reference.

Next is introduced an architecture for quantum enhanced secure communication between users in a cloud environment. FIG. 1 illustrates the general cloud environment 100. Users or tenants 104 are offered quantum-enhanced security measures as services as follows. The users 104 log in to their cloud environment using an existing classical authentication process. This can be done in an application layer 102 of the cloud environment 100. Once the users 104 authenticate and log in to their cloud environment 100, they are offered the option of using a higher form of inter-user communication security leveraging quantum teleportation. This "as-a-Service" option consists of offering the customers one or more options for higher security including the application of Quantum SeCurity as a service (QSeCaaS) for communication between users (such as Alice 106 as a first node N1 and Bob 108 as a second node N2) on the cloud environment 100 with the help of a QEP 120. The QEP 120 consists of a quantum state generating server which acts as a source of EPR Bell state pairs (or other types of entangled pairs of particles) and offering robust additional security via quantum teleportation.

A container daemon 114 runs a number of the processes of this new concept and, for example, receives a secure key pair 117 from the QEP 120 and/or a secure key pair 124 from the application layer 102 and uses the secure key pair to process requests for access from, for example, a quantum processor corresponder (computer) 122, a first user 106, a second user 108 or other users 110, 112. Nodes N3, N4, N5, N6, N7 are illustrated by way of example as other tenants of the cloud environment 100. The computer 122 can also represent Alice's computer or the computer of the first user from which the access request is first received. The container daemon 114 can run the processes associated with containers provisioned for the various users 104. A quantum key management layer 116 can also be operational on a host server 118 for processing the quantum keys as disclosed herein. The other computers 110 and 112 are shown for the purpose of illustrating that many people can access the cloud environment 102 and can have access to the options and secure communication approach disclosed herein.

Before the users can avail of the benefits of the enhanced security using the quantum EPR processor (QEP) server 120, they need to authenticate against the server and run authorization verification. This authentication process will involve a protocol for cloud server authentication and verification of entanglements under the assumption that a third malicious presence is able to change or hijack the key shared between the users and the QEP 120.

The approach disclosed herein assumes that the proper and necessary hardware is available as part of the cloud environment 100 for each of the parties that need to be authenticated themselves first and then to authenticate each other to be able to receive secure key pairs and to evaluate the respective quantum participles or qubits. The ability to receive quantum particles can be included in the hardware associated with the host server 118. The cloud environment 100 in this case can include the classical components 102 of a cloud with users 104 or tenants who can access compute resources as well as the addition in this case of the EQP 120 for generating secure key pairs 121 for users to utilize for cloud container security according to this disclosure. Part of the new service is quantum hardware that is part of the host service 118 such that each tenant can get their respective secure key pairs associated with their containers in the cloud environment 100. The infrastructure for passing the respective secure key pairs to the proper destination is also included within this disclosure.

The process shown in FIG. 1 would proceed as follows. The uses must register with the system. The user Alice 106 or Bob 108 wishing to access the service requests permission to the QEP server 120 and establish a communication channel with the QEP server 120. In order to have that permission, the user needs to register for the service. The respective user communicates a request ID (rID) to the QEP 120 service provider which in this case is performed by a server 120 which is logically collocated with the QEP. The QEP 120 processes the parameters for authentication such as login (l_id), registration number (rn), password (pwd) and stores the values mapped to the specific user rID. The QEP 120 confirms the password to the user. As used herein the QEP service provider and the QEP can be considered the same entity 120.

First, as noted above, the access request is received from a first computer 122. In one aspect, Alice 106 and Bob 108 could be confirmed with respect to their authentication in a classical manner. Alice 106 logs into the system using a classical standard login procedure.

Then, once Alice 106 has logged in, she needs to be validated by the QEP 120. As a service, the cloud environment 100 will verify Alice 106 using a secure key pair 121 generated at the QEP 120. Other users such as Bob 108 can do the same. The secure key pair 121 is a pair of quantum entangled particles.

Once Alice 106 is verified, only then can she provide a request to communicate with Bob 108 in a secure quantum manner by receiving a sure key pair 121 again from the QEP 120. This secure key pair is used as an authentication process for Alice 106 and Bob 108 to be able to use quantum techniques to identify or authenticate each other.

The quantum identity authentication between Alice 106 and Bob 108 can proceed as follows. This process enables access to the QEP 120 via cloud services authentication. After registering for the QEP 120, in order to start the authentication process with the QEP 120, the user is required to provide the authentication credentials as negotiated during the registration process. Authentication is done via identity verification. One instance is common authentication. A user transmits rID and pwd to the QEP 120. The QEP 120 verifies the credentials (pwd, rID) against values stored during the registration process describe above. The QEP 120 denies access if user is unauthorized. The QEP 120 grants access if verification is successful, and user is then authorized.

In another instance, consider a third-party malicious presence trying to hack the communication. A hacker trying to pose as an authorized user or trying to alter the password "pwd" is a case that needs to be considered. One way of mitigating this is to use classical Multi Factor Authentication (MFA), for which a company can avail of DUO type solutions. The DUO solution is a user-centric access security platform that provides two-factor authentication and is a product provided by Cisco as an example of a MFA that could be applied, as well as other security approaches.

When Alice 106 and Bob 108 verify each other, they can then interact in an enhanced secure environment. They each receive a secure key pair 121 generated by the QEP 120 for use in verifying each other.

The authentication process with the secure key pairs 121 is as follows. Once the authorized user has access to the QEP based enhanced security services, the QEP 120 starts the process of generation EPR pairs. The QEP 120 generates the required number (n) of EPR pairs. The QEP 120 reserves the initial qubit to form a sequence {qU} of EPR pairs. The QEP 120 applies Hadamard gate operation (H) on the qubits and generates the sequence {qU}. The QEP 120 selects 2n qubits as verification and control qubits from the generated sequence {qU}. The QEP 120 determines the bit value of the password pwd and based on that performs CNOT (controlled-NOT) operation to generate unentangled qubits for verification. Then, using the cloud services authentications channel described above, the QEP 120 communicates the verification qubits to the user or more specifically to a device capable of receiving qubits and associated with the user.

The user side takes the bit value of password pwd and performs Hadamard operation on the check qubits in order to compare if the values match with expectation. If they match, then the authentication process is successful and users can, then engage in EPR-enabled enhanced secure communication utilizing the underlying physical quantum channel. To enable access for activation of applications such as file access, routing authentication etc., the user sends access requests to the QEP 120.

The details of the process are outlined in the algorithm of FIG. 6. The received secure key pair is shown as feature 117 in the container daemon 114 and as it is provided to one of the end users like Alice 106 or Bob 108, the secure key pair can be represented by feature 124.

The access is requested from a tenant 104 and the request goes to the container daemon 114 and can also be provided to the quantum key management layer 116. A secure key pair 117 can be available in the container daemon 114 for providing verification of the user making the request. The request gets validated by the server 120 and confirms, based on the secure key pair (that she gets), Alice 106 gets the secure key pair and Bob 108 can also get the secure key pair to authenticate him as well. Since the secure key pairs come from the same origin, they can be used for Alice 106 and Bob 108 to confirm their respective identities and then to exchange information also via a quantum channel. Both Alice 106 and Bob 108 can be validated and get the same secure key pair, so that they can also authenticate each other in a quantum manner. This process is described in more detail in FIGS. 3A and 3B.

This disclosure builds on currently available existing architecture and technology as a first step to deployment of quantum enhanced security at scale as cloud-based services. The disclosure addresses quantum teleportation-based security for data utilizing an Eckert 91 type protocol. See Ekert. A, Phys. Rev. Lett. 67, 661-663 (1991), incorporated herein by reference. This includes the concept of a quantum server 120 which handles the EPR (Einstein-Podolsky-Rosen) Bell pairs. Note in FIG. 1 they are called a secure key pair as part of the QEP 120. FIG. 1 depicts the primary architecture of the proposed solution. FIG. 1 depicts a QEP generating server 120 which acts as a source of EPR (Einstein, Podolsky and Rosen) Bell state pairs and offers robust additional security via quantum teleportation.

Figure 3A:
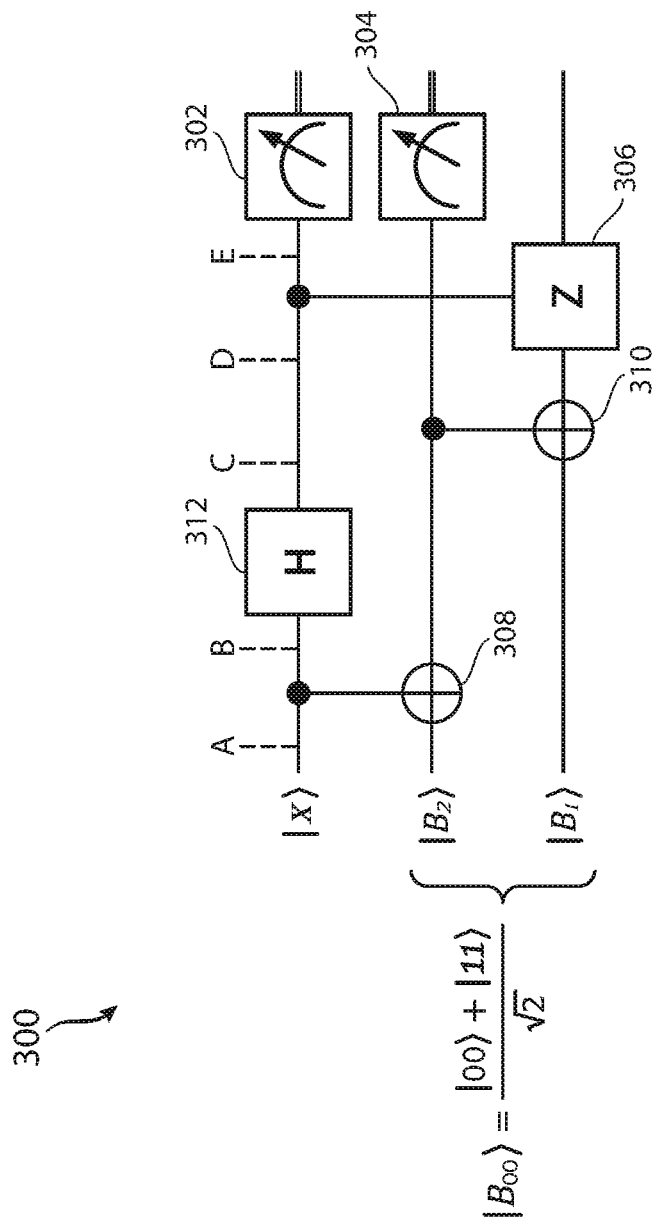
FIG. 3A illustrates a 3-qubit teleportation approach used for cloud container security, according to some aspects of this disclosure.

In order to understand the processes described herein, some background for entanglement distribution with separable states with probabilistic cloning is provided next. With respect to entanglement, the users 104 can be offered the option to tighten their security leveraging quantum teleportation. A standard teleportation circuit 300 is illustrated in FIG. 3A. This option works by distributing entangled quantum particles. These entangled particles, once distributed in a controlled manner between ends, create virtual channels. Quantum teleportation is a phenomenon which leverages entangled Bell pairs for an EPR (Einstein-Podolsky-Rosen) source. Quantum entanglement is one of the fundamental directions of application of quantum information theory. It cannot come from classical communication and related local operations and represents a more complex relationship in the physical systems than is possible in the classical world. Entanglement distribution between different nodes of a quantum network is vital for establishing communication between those nodes.

The general theory is as follows: A sender, say Alice, transmits one particle of an entangled pair to the destination while retaining the other particle as source. For an eavesdropper Eve, it is deemed impossible by the laws of physics to observe and measure the entangled particle without destroying its state or causing the entangled particle in a quantum superposition state defined by a wavefunction to collapse the wave function and cause a single state to emerge. As soon as she measures a specific state, the act of measurement causes the wavefunction to collapse into a chosen state. A single wavefunction defines both entangled particles. Thus, if the wavefunction is collapsed for one entangled particle (it is measured, for example), then the wavefunction for the other particle also collapses into its corresponding state. In other words, there is no way for Eve to breach the security. This property of quantum entanglement renders it a secure channel. Not only is the security tight for an entangled pair, theoretically, a pair of particles can remain entangled independent of distance, even at cosmic scale. Experimentally, quantum entanglement has been proven for up to an approximate distance of 1200 km between space and earth and 50 km on terrestrial experiments. A classically open channel is required for the receiver Bob to efficiently decode the quantum data for which an Eckert 91 type entanglement is proposed for tight security. This approach shown in FIG. 3A can be used for qubit teleportation for Alice 106 and Bob 108 to communicate.

FIG. 3A depicts the generic teleportation architecture 300. The model shown works with three qubits: qubit 1 in state $|x\rangle$ is an arbitrary state to be teleported by Alice 106 to Bob 108. Alice 106 first transports the entangled qubit $|B1\rangle)$ to Bob 108 via the quantum channel. Qubits 2 and 3 in FIG. 3A are entangled EPR pairs in Bell state.

$$|B_{00}\rangle = \frac{|00\rangle + |11\rangle}{\sqrt{2}} = |\varphi^+\rangle \quad (1)$$

$|B00\rangle$ in equation (1) has subscripts as "00" to indicate that as per convention, all qubits are initialized at state $|0\rangle$.

In FIG. 3A, the three-qubit state in five characteristic points of a quantum circuit is shown. The input three-qubit state at point A is given by:

$$|\psi_1\rangle = \frac{|x00\rangle + |x11\rangle}{\sqrt{2}} \quad (2)$$

The first qubit is used as a control qubit and the second qubit is the target qubit for the CNOT (Control-X) gate 308. Therefore, the state at point B becomes, $$|\psi_2\rangle = \frac{|xx0\rangle + |x(1-x)1\rangle}{\sqrt{2}} \quad (3)$$

The Hadamard gate (H) 312 performs mapping on the first qubit, $$H|x\rangle = \frac{|0\rangle + (-1)^x|1\rangle}{\sqrt{2}} \quad (4)$$

The state at point C is given by:

$$|\psi_3\rangle = \frac{|0x0\rangle + (-1)^x|1x0\rangle + |0(1-x)1\rangle + (-1)^x|1(1-x)1\rangle}{\sqrt{2}} \quad (5)$$

The second qubit is used as a control qubit and the third as a target qubit in the CNOT gate 310. The quantum state at point D is given by:

$$|\psi_4\rangle = \frac{|0xx\rangle + (-1)^x|1xx\rangle + |0(1-x)x\rangle + (-1)^x|1(1-x)x\rangle}{\sqrt{2}} \quad (6)$$

Finally, the state at point E is given by (as the first qubit is used for control and third as target for the controlled-Z gate 306), $$|\psi_5\rangle = \frac{|0xx\rangle + |1xx\rangle + |0(1-x)x\rangle + |1(1-x)x\rangle}{\sqrt{2}} \quad (7)$$

$$= \frac{|0x\rangle + |1x\rangle + |0(1-x)\rangle + |1(1-x)\rangle}{\sqrt{2}} \otimes |x\rangle \quad (8)$$

As a last step, measurement 302, 304 is performed on the first two qubits which are destroyed (meaning the measurement causes their wavefunctions to collapse into a respective state) and the third qubit is delivered to the receiver. Comparison between the destination and source qubits offers the conclusion that the correct quantum state was teleported. This analysis does not necessarily take into account any errors introduced by the quantum channel.

Also, it is to be noted that the teleported state is not a superposition state. Thus, any arbitrary state $|B1\rangle$ can be teleported by FIG. 3A scheme. Alice 106 measures her side-channel data and sends it to Bob 108 via a classical channel. Bob reconstructs the quantum data using classically controlled Pauli X (or CNOT) 308, 310 and Z gates 306 in FIG. 3A.

The above scenario is inherently secure because measurement will change the state of the entangled particles. In addition, an attacker would require access to both the quantum and classical channels in order to decode any data successfully.

In quantum information theory, GHZ state stands for Greenberger—Horne—Zeilinger state first studied by Daniel Greenberger, Michael Horne and Anton Zeilinger in 1989. It is a certain type of entangled quantum state that involves more than two subsystems (e.g. particle states, or qubits). The GHZ state is a maximally entangled quantum state. For a system comprised of n subsystems each of which are two dimensional (i.e. qubits) the GHZ state is given by $$|GHZ\rangle = \frac{|0\rangle^{\otimes n} + |1\rangle^{\otimes n}}{\sqrt{2}} \quad (9)$$

The 3-qubit GHZ state is the simplest one, which exhibits non-trivial multipartite entanglement:

$$|GHZ\rangle = \frac{|000\rangle + |111\rangle}{\sqrt{2}} \quad (10)$$

A GHZ state is a quantum superposition of all subsystems being in state 0 with all of them being in state 1 where states 0 and 1 of a single subsystem are fully distinguishable. A GHZ can be prepared using a quantum circuit and it has been shown that GHZ states can be used to share secret leveraging entanglement. Fundamentally, there are three different approaches for using entanglement for quantum network communication. In a first approach, direct entanglement distribution is the general scenario described above in the background section. In a second approach, indirect entanglement distribution is an ancillary (or assistant quantum) system which is used to create an entanglement between the quantum memories of Alice node and Bob node by initially establishing an entanglement between the nodes and the ancillary system. Then the ancillary system is sent through a physical quantum channel to the target (Bob) node. The destination (Bob) performs a local operation on its quantum memory and the ancillary system and causes an entanglement between the Source (Alice) node and target (Bob) node.

In a third approach, the entanglement distribution with separable states has been used to show that generally no entanglement is necessary between two distant nodes to distribute entanglement and the two distant nodes can be entangled by sending an ancillary particle that has no entanglement relationship with the other two. This method is called entanglement distribution with separable states.

Figure 2:
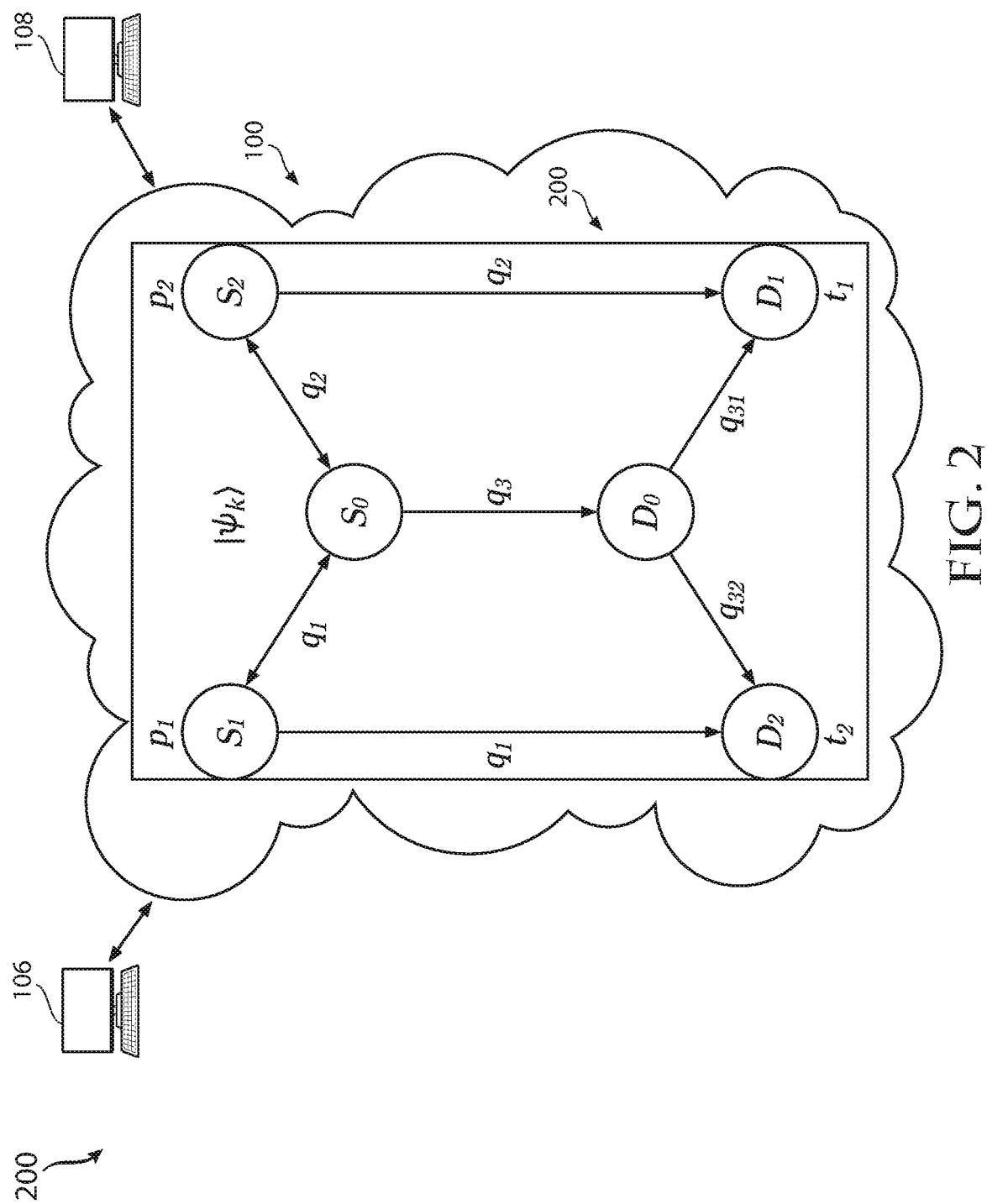
FIG. 2 illustrates a butterfly topology for entanglement distribution with separable ancilla qubits, according to some aspects of this disclosure.

Part of this disclosure is the use of a butterfly topology shown in FIG. 2. Since quantum information is continuous, its handling is surprisingly harder than the classical counterpart. A typical example is cloning; making a copy of digital information is straightforward but it is not possible exactly for quantum information. Quantum network coding is possible if approximation in cloning is allowed, by using the network model called a butterfly. In this network, there are two flow paths which shares a single bottleneck channel of capacity one. In the classical case, one can send two bits simultaneously, one for each path, in spite of the bottleneck. Any quantum state can be simultaneously sent between source and destination in such a butterfly network with fidelity strictly greater than 0.5.

A quantum no-cloning theorem asserts that non-orthogonal states cannot be cloned, but it does not deny the possibility of inaccurate cloning. There are two types of quantum cloning techniques, both of whom are governed by the quantum no-cloning theorem. The first is definitive cloning which involves performing unitary transformations through the entire cloning process. Definitive cloning looks to increasing the fidelity of inaccurate cloning, the realization and nature of definitive cloning have been investigated. It has been pointed out that the upper bound of the fidelity of a deterministic quantum copier with a single input and double output is $5/6$.

In another aspect, probabilistic cloning combines unitary transformation and quantum measurement during cloning. In probabilistic cloning of a quantum system, quantum measurements are introduced to accurately clone a set of linearly independent quantum states with a certain probability.

As per above theories, probability of successful cloning is given by Ain, where n is the cloning efficiency. It has been shown that upper bounds of n depend on the input states. If the input states are given by set $\{|\Psi 0\rangle, |\Psi 1\rangle\}$, then the maximum efficiency of probabilistic cloning is given by:

$$\eta = \frac{1}{1 + \langle \psi_0 | \psi_1 \rangle} \quad (11)$$

The entanglement distribution with separable states with probabilistic cloning of this disclosure is an improvement upon prior arts in the following main ways. The solution combines entanglement distribution with separable states with probabilistic cloning to derive a quantum network communication operation. The solution employs separable states for entanglement distribution with probabilistic cloning and offers improvement in terms of noise mitigation and fidelity. The quantum network communication builds on forming a quantum teleportation channel between source and destination via transmission of intermediate quantum states. The process does not involve classical information exchange due to reasons discussed above. A butterfly network topology is adopted and enhanced by an n-qubit entanglement of which a GHZ (Greenberger-Horne-Zeilinger) state entanglement is an example. Probabilistic cloning properties of quantum states is also applied to this same state. The basic properties of GHZ states can be used in conjunction with the butterfly topology.

Some articles such as in B. Kelley, J. J. Prevost, P. Rada and A. Fatima, "Securing Cloud Containers Using Quantum Networking Channels," 2016 IEEE International Conference on Smart Cloud (SmartCloud), New York, NY, 2016, pp. 103-111, doi: 10.1109/SmartCloud.216.58: https://ieeexplore.ieee.org/document/7796159. only recommends an algorithm for resource control of entangled Bell pairs but none for identity authentication, query for actual quantum key distribution in an entangled environment. This disclosure offers an algorithm to address the authentication and query in combination with key distribution logic. The same reference only recommends an algorithm for resource control of entangled Bell pairs but none for identity authentication, query for actual quantum key distribution and quantum information flow in an entangled environment. This disclosure offers an algorithm to address the authentication and query in combination with key distribution logic and flow of quantum information.

FIG. 2 illustrates the butterfly topology 200 for entanglement distribution with separable control or ancilla qubits. This is a quantum only channel in that using the butterfly topology 200 can involve not having a separate classical channel to send or receive information associated with the quantum process. The protocol architecture disclosed is based on a butterfly network topology 200 shown in FIG. 2 using the entanglement and secret sharing properties of GHZ states as an example, as described in the background section. In one aspect, the communication established as shown in FIG. 2 occurs after parties have been authenticated in the cloud environment 102. Once they are authenticated and then wanted to communicate, the parties (Alice and Bob, for example) can utilize this approach for a more secure communication.

The nodes described in FIG. 2, $S_1$, $S_2$, $D_1$ and $D_2$ can represent the quantum-related hardware that is made available to users in the cloud environment 100 that enables the quantum communication channel. Generally, these can be any device (such as a quantum computer) that produces or stores quantum particles. In other words, these nodes are not necessarily the end user equipment like a laptop but are hardware components offered as part of the services available for secure communication in the cloud environment 100. Users like Alice and Bob access the cloud environment 102 via their regular computers 106, 108. In one aspect, where a laptop 106 for example, is used as a source for data sent from Alice to Bob (at his computer 108), the source node $S_1$ can represent or be used for Alice 106. Also, Alice will receive information from Bob 108 and therefore Alice 106 will also be a destination for data. Thus, $D_1$ might represent also Alice's computer 106 that will receive data associated with $q_2$. Note that Bob 108 might also be represented by $S_2$ as a source of data and by $D_2$ as a destination for data.

As shown in FIG. 2, in step 1, the source nodes, designated as $S_1$ and $S_2$, simultaneously send quantum information to destination nodes $D_1$ and $D_2$ via intermediate nodes $S_0$ and $D_0$. Step 2 involves the encoding the quantum states at node $S_0$. In step 2, node $S_0$ encrypts $q_1$ (received from node $S_1$) and $q_2$ (received from $S_2$). The message or output from node $S_0$ is $q_3$, is sent to $D_0$. Step 3 involves the decoding of the quantum states ($q_3$) at node $D_0$.

In step 4, Alice and Bob prepare a correlated separable state, where Alice has particles $p_i$ and $q_i$ and Bob has particles $t_i$, i=1, 2, n. Step 5 involves qubits $p_i$, $q_1$ being prepared at node $S_1$ and qubit $t_1$ is prepared at node $D_1$. Step 6 involves the qubit $p_1$ being the control or ancilla qubit at node $S_1$. Step 7 involves qubits $p_2$, $q_2$ being prepared at nodes $S_2$ and qubits $t_2$ being prepared at $D_2$. The $p_2$ qubit is the control or ancilla qubit at node $S_2$. In step 8, at this stage, this system can be modelled as a mixed system given by a state $|\Psi k\rangle = 1/\sqrt{2}[|0\rangle + e^{ik\pi/2}|1\rangle)]$ and from the theory of mixed quantum systems, the density matrix for the mixed state can be modelled by:

$$\rho_{p_i q_i t_i} = \frac{1}{6}\left[\sum_{j=0}^{1}|j,j,1\rangle\langle j,j,1| + \sum_{k=0}^{3}|\psi_k,\psi_{-k},0\rangle\langle\psi_k,\psi_{-k},0|\right], \quad (12)$$

for $i = 1, 2$

In step 9, a Pauli X-gate (or CNOT gate) is applied to qubits $p_1$ and $q_1$ at node $S_1$ with $p_1$ as the control or ancilla qubit.

In step 10, similar to step 9, a Pauli X-gate (or CNOT gate) is applied to qubits $p_2$ and $q_2$ at node $S_2$ with pa as the control or ancilla qubit.

In step 11, after steps 9 and 10 are completed, then, for i=1, 2 and $|GHZ\rangle = (|000\rangle + |111\rangle)/\sqrt{2}$ given by equation (10), the state of the system is given by:

$$\psi_{p_i q_i t_i} = \sum_{j,k,l=0}^{1} B_{jkl}|jkl\rangle\langle jkl| + \frac{1}{3}|GHZ\rangle\langle GHZ| \quad (13)$$

where, $B_{001}=B_{010}=B_{101}=B_{110}=\frac{1}{6}$ and all other values of $B_{jkl}=0$.

In step 12, node $S_1$ sends $q_1$ to $S_0$; Node $S_2$ sends $q_2$ to $S_0$.

In step 13, at node $S_0$, a new qubit $q_3$ is initialized at state $|0\rangle$.

In step 14, a unitary transformation U of the CNOT gate is applied to $q_1$ and $q_2$ with $q_2$ as the control bit. The output of step 14 is a unitary CNOT transformation of whatever state $q_1$ and $q_2$ would be in. This cannot be determined deterministically and will be a result that is probabilistic in nature, depending on what states $q_1$ and $q_2$ are in from Step 12.

In step 15, the output of step 14 is fed to $q_3$ from step 13. In Step 15, the output of Step 14 is fed into $q_3$ that was initialized at state $|0\rangle$ in Step 13 as a new qubit. This $q_3$ is used in the probabilistic cloning in Step 17.

In step 16, node So sends $q_1$ to $D_2$ via node $S_1$; Node $S_0$ sends $q_2$ to $D_1$ via $S_2$; Node $S_0$ sends $q_3$ to $D_0$.

In step 17, at node $D_0$, probabilistic cloning of $q_3$ produces $q_{31}$ and $q_{32}$; $q_{31}$ is sent to $D_1$ and $q_{32}$ is sent to $D_2$.

In step 18, with $q_2$ as the control or ancilla bit, a Pauli X-gate (or CNOT gate) operation is performed on $q_2$ and $q_{31}$ at node $D_1$. This results in $q_{31}$ being approximately equal to $q_1$.

In step 19, with $q_1$ as the control or ancilla bit, a Pauli X-gate (or CNOT gate) operation is performed on $q_1$ and $q_{32}$ at node $D_2$. This results in $q_{32}$ being approximately equal to $q_2$.

In step 20, with $t_1$ as the control or ancilla bit, a Pauli X-gate (or CNOT gate) operation is performed on $t_1$ and $q_{31}$ at node $D_1$.

In step 21, with to as the control or ancilla bit, a Pauli X-gate (or CNOT gate) operation is performed on to and $q_{32}$ at node $D_2$.

In step 22, after steps 18 to 21 are complete, the state of the system is given in terms of Bell state definitions of equation (1), by $$\psi_{p_i t_i q_{3i}} = \frac{1}{3}|\phi^+\rangle_{p_i t_i}\langle\varphi^+|\otimes|0\rangle_{q_{3i}}\langle 0| + \frac{2}{3}I_{p_i t_i} \otimes |1\rangle_{q_{3i}}\langle 1| \quad (14)$$

In step 23, after step 22 above, the EPR pairs in Bell state $|\varphi+\rangle p_i t_i = (|00\rangle + |11\rangle)/\sqrt{2}$ remains maximally entangled. The state $\Psi p_i t_i q_{31}$ now possesses entanglement between $p_1$ and $t_1$ with the ancilla bit $q_{31}$ still remaining separable with respect to the state of the system. This completes establishing the direct quantum teleportation channel between $S_1$, $D_1$, $S_2$ and $D_2$z.

In step 24, if the ancilla bit $q_{31}$ is discarded, then the density matrix of the final system is obtained as follows:

$$\rho_{p_i t_i} = \frac{2}{3}|\varphi^+\rangle\langle\varphi^+| + \frac{1}{6}|01\rangle\langle 01| + \frac{1}{6}|10\rangle\langle 10| \quad (15)$$

The probability of maximally entangled states at destination nodes $D_1$ and $D_2$ are greater than ⅔. The probability to create the states $q_{31}$ and $q_{32}$ as approximately equal to $q_1$ and $q_2$ in Steps 18 and 19 respectively is given by equation (11) for the probabilistic cloning efficiency.

The following apply to butterfly topologies 200 as shown in FIG. 2. The fidelities at nodes $D_1$ and $D_2$ are (½+200/19863) and (½+180/19863), respectively. Quantum network coding is possible if the use of approximation is allowed. The study of approximate or probabilistic methods to deal with qubits is applied in this disclosure. Hence, using the concept of probabilistic cloning while maintaining the fidelity at >½ for a separable GHZ state driven gives a proven route to use teleportation towards secure quantum networking. There is currently a distance limitation on entanglement engagement which can be overcome with quantum repeaters where entanglement swapping can be leveraged for repeater technology.

Tenant security is important in the context of cloud computing. In the instance of tenants using platforms on the cloud: when containers are first spun up, they get initiated in an unprivileged mode which restricts their access to kernels and associated resources. This behavior is installed by default in order to protect an entire system from being impacted by a compromised container. However, an application, in order to have root access, can send a request to the QEP through a classical channel in the stack. The key management layer processes the keys in a secure environment as demonstrated by the Swiss Quantum field test which is known in the art where fibre channel encryptors were used.

The prior art does not take into account the factor of Alice or Bob as users being compromised after the start of the protocol. In contrast to the traditional approach, this disclosure includes: (1) An identity authentication process (Steps 35-44 of the algorithm in FIG. 6); and (2) A query process (Steps 16-22 of the algorithm in FIG. 6) for actual quantum key distribution in an entangled environment. The algorithm for this is also described at a higher level in FIG. 5. The measurement sent over classical channels, if needed, can also be protected for additional security with unbreakable classical encryptions such as McEliece, which is a known encryption scheme.

The following basic actions can be performed as part of this disclosed process. To enable access for activation of applications such as file access, routing authentication etc., the container daemon sends access requests to the QEP 120. To process the request, an entangled EPR pair is produced by the QEP 120. The retained half of the EPR pair interacts with the QEP's information qubit. The encryptors of the key management layer convert key data into electronic bits which can then be transmitted over classical channel up the stack.

The secure qubit generated key can then be used for secure communication between a running application in the container and the container daemon. Root access into the container daemon 114 is allowed only for containers that have assigned secure keys. Hence the kernel is protected from compromised rogue containers. The keys are generated with true randomness and cannot be predicted. The unpredictability ensures the security.

An example algorithm follows. Quantum teleportation leveraged security can be scaled across networking nodes. The links between the nodes can be secured with EPR Bell pairs. The nodes are connected via entangled links. Each node generates a designated number of Bell pairs for established communication. The links secured by quantum entanglement will work as follows: two nodes, once entangled by a Bell pair will be secure but enactment of security via that specific Bell pair will exhaust that same Bell pair. In other words, those nodes can use that specific Bell pair only once. As the Bell pairs are used, the amount of available Bell pairs will decrease. This will exhaust the node of secure Bell pairs and will require regeneration of new EPR states.

Figure 3B:
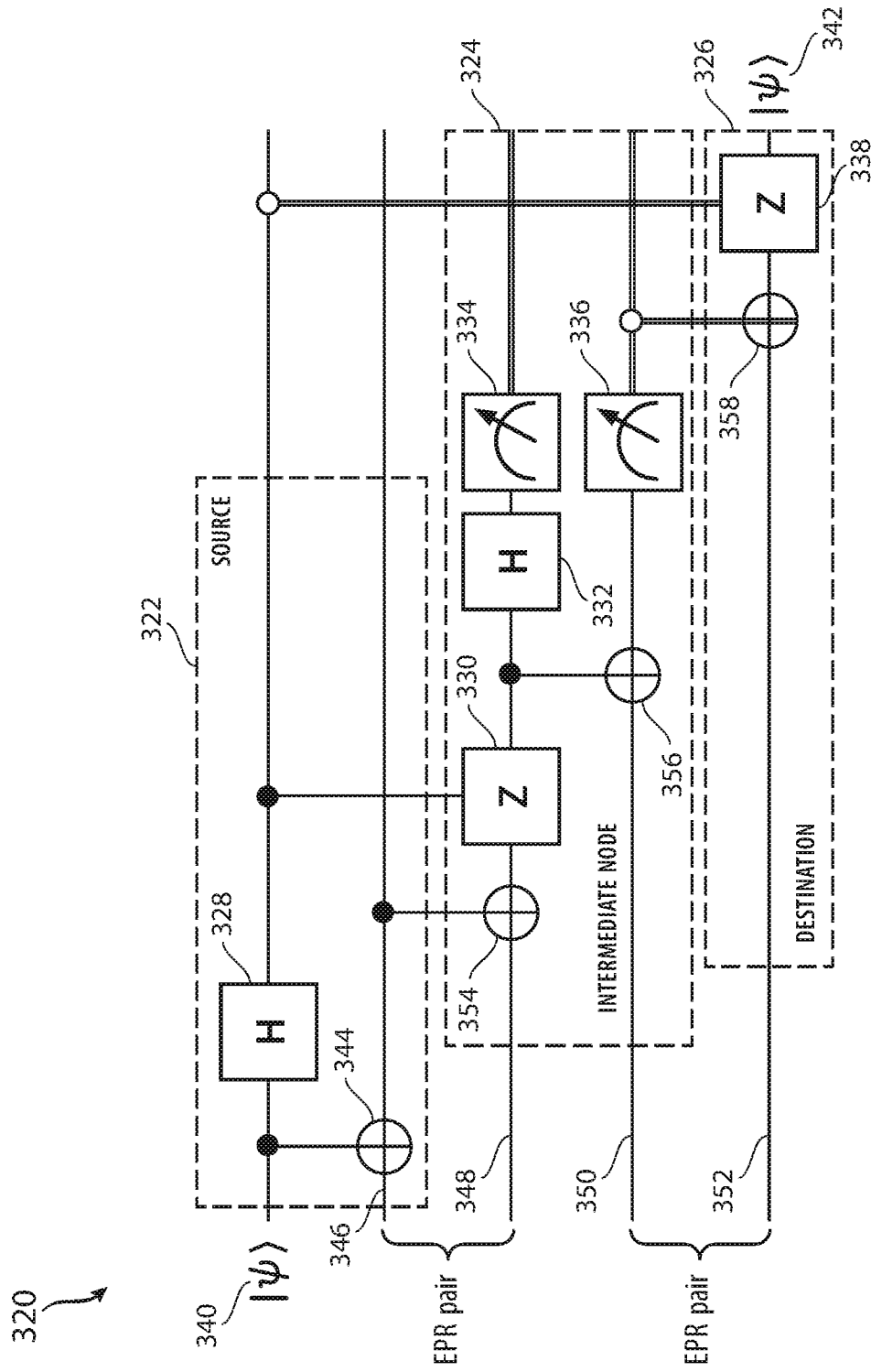
FIG. 3B illustrates a quantum teleportation relay for long distance communication, according to some aspects of this disclosure.
Figure 5:
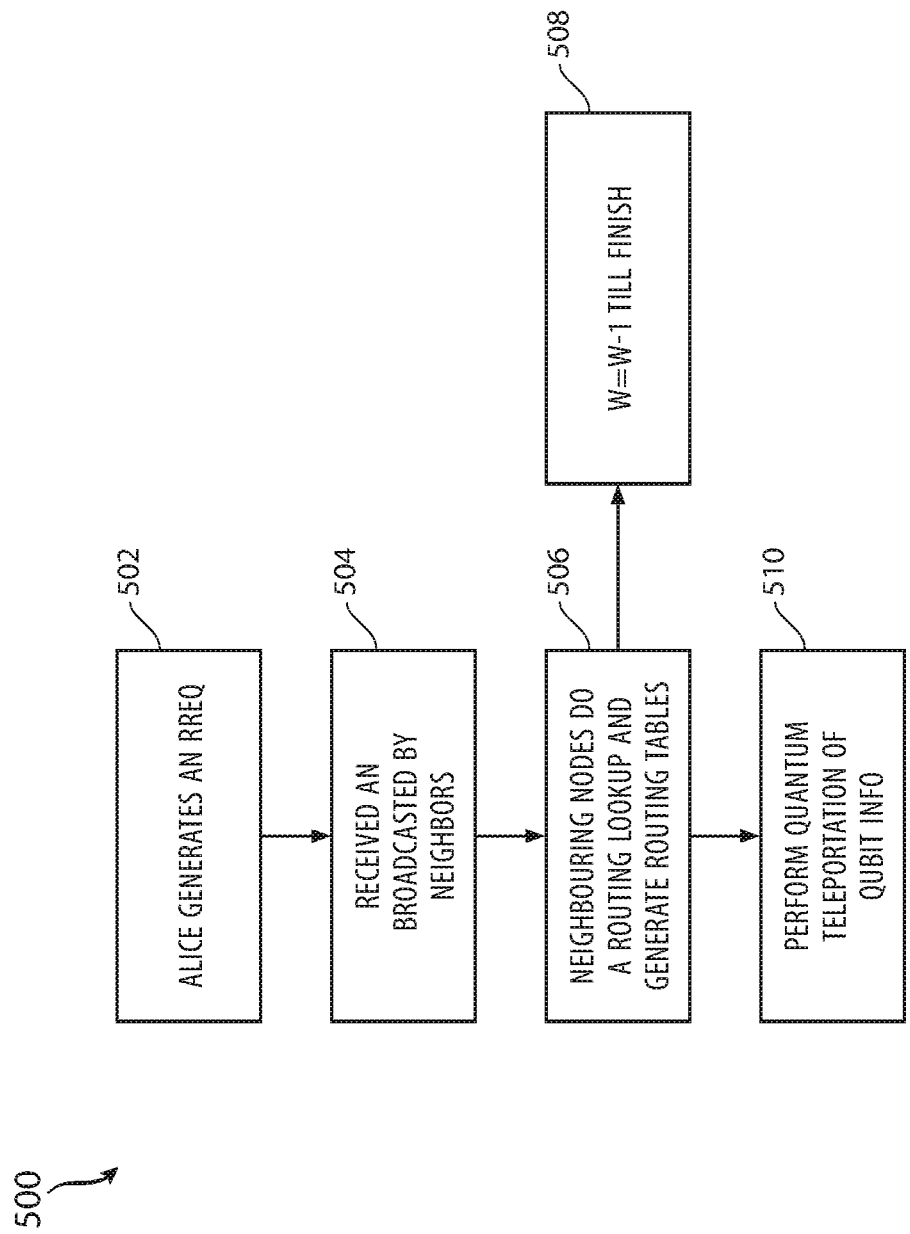
FIG. 5 illustrates a flow diagram for EPR pair routing, according to some aspects of this disclosure.

The following describes a network algorithm for EPR Bell pair distribution depicted in FIG. 5. FIG. 5 illustrates the flow diagram 500 for EPR pair routing. It is to be noted that, as mentioned before, implementation of quantum teleportation today suffers from a distance limitation which is usually addressed in literature via quantum repeaters, entanglement purification and quantum relays. However, one of the main obstacles for the quantum repeater and relay-based solutions is the quantum no-cloning theorem which prohibits duplication of a key—which in turn becomes a challenge for implementation of authentication in long range communication. The teleportation mentioned above can be used to implement a quantum relay as shown in FIG. 3B. Prior to stepping through the process of FIG. 5, the long-distance communication process of FIG. 3B is first discussed.

FIG. 3B illustrates a quantum teleportation relay 320 for long-distance communication in which the original qubit 340 it teleported to a destination as qubit 342. This approach can be used for example to provide a quantum teleportation relay between two tenants or containers in the cloud environment 100 in which the virtual containers (or the hardware on which they exist) are positioned far apart. This approach uses a source node 322, an intermediate node 324 and a destination node 326, for the purpose of providing a teleportation relay. In one aspect, other intermediate nodes could be used as well to further extend the distance between the source node and the destination node.

First, the first qubit 340 and a second qubit 346 that is part of an EPR pair are provided to a CNOT gate 344. The Hadamard gate (H) 328 performs mapping on the first qubit 340. This process can occur at a source node 322. The second qubit 346 is a control bit and the third qubit 348 as a target qubit in the CNOT gate 354. The first qubit 340 is the control qubit and the third qubit 348 is used for the target qubit for the controlled Z gate 330. The third qubit can be a control qubit and a fourth qubit 350 can operate as a target qubit in the CNOT gate 356. The Hadamard gate (H) 332 performs a mapping on the third qubit 348. A measurement is performed on the third qubit 334 and the fourth qubit 336 leaving a fifth qubit 352. The measurement operations 334, 336 are performed as part of an intermediate node process 324. In the final state, the fourth qubit 350 operates as a control qubit and a fifth qubit operates as a target qubit in the controlled Z-gate 338. At the destination node 326, the fifth qubit 342 is delivered. This approach describes a quantum teleportation relay for long distance communications.

FIG. 4 illustrates an example approach to providing Bell pair distribution in a network leveraging teleportation. The steps outline qubit information can be teleported from a destination node to a source node, as well as how information from the source node or nodes and be teleported to the destination node or nodes. Those of skill in the art will understand the Bell pair distribution process and now it can be used for teleportation of quantum particles.

As shown in FIG. 5, the first step is a first user (who can be called Alice) generates a route request (RREQ) (502). The RREQ can be a packet that includes an entanglement request connecting a node associated with the first user with a node associated with a second user (called Bob). See step 1 of FIG. 6. The RREQ is received and forwarded by a node in a network such as a next hop and/or neighboring node (504). See steps 4-5 of FIG. 6. The neighboring nodes perform a routing lookup and generate routing tables (506). The routing tables can include reverse routing tables that are used to record the path to the source node associated with the first user. The process is iterated (508) until all jobs or entangled particles (EPR Bell pairs in one example) are covered. The neighboring nodes can add remaining EPR Bell pair numbers on an "EPR available" list and assign a number to them. See step 6 of FIG. 6. The method 500 can then include performing quantum teleportation of qubit information (510). See step 12 of FIG. 6. The quantum teleportation approach can use the probabilistic cloning disclosed in FIG. 2 and/or FIG. 6.

The entry point for manufacturers to apply the principles disclosed herein is the fact that they will only need to produce the device/solution without the need for the whole network and all its associated device to be "quantum aware". The telecommunications industry perspective is that the services will run inside a trusted domain which is a secure environment from a physical and logical point of view—hence using trusted repeaters does not involve an extra security assumption. Different QoS can still be distinguished and managed accordingly. For a start, this solution can be implemented as a small-scale quantum network and then expanded in an incremental manner. The quantum part of the larger network can be upgraded as and when technologies become available. A hybrid of classical and quantum switching network has been tested. This can be used for starter solution and expanded as and when new technology becomes available. A hybrid usage of quantum and classical crypto can be easily implemented, with AES 256 type of algorithm for the classical part. The network itself can be a user of the quantum security. As noted above, the host server 118 (in connection with the QEP 120) can represent the quantum part of the larger cloud environment 100.

When a communication such as an exchange of emails requires multiple different transmissions of data, then in one aspect, the system would generate new secure key pairs 121 for each communication. Whether new secure key pairs 121 are generated can depend on factors such as the persistency of a communication channel, how intermittent the communication is, how much data is sent, and so forth. If Alice 106 sends a file via email to Bob 108, a secure key pair 121 can be used for that transmission. Bob 108 may look at the email an hour later and send a return email with comments or another document. Another secure key pair 121 may be generated for the return email. For asynchronous communications, multiple secure key pairs 121 may need to be generated. However, for a video stream such as a Zoom call, once the session is established and people are authenticated, the same secure key pair 121 may be used for the live session. A chat session, or where documents are being exchanged, there could be a challenge in that there is a temporal aspect to how long the secure key pairs 121 exist.

FIG. 6 illustrates an algorithm 600 which provides a probabilistic cloning assisted entanglement distribution of separable states for teleportation. The steps shown outline how a first user Alice will request communication from a source node $S_1$ to a destination node $D_j$ associated with a second user Bob. A query process is shown in steps 16-22 of the algorithm for actual quantum key distribution in an entangled environment. The identity authentication process described herein is implemented via steps 35-44 of the algorithm in which Bob at Dj sends the measured sequence to Alice and Alice at node $S_1$ verifies it for security by measuring each qubit randomly in Bell or Z-basis. Alice announces positions of the verification pairs and requests that Bob announce her prepared state. The next steps 45-52 in FIG. 6 determine if the authenticity of Bob is verified or not and whether the entanglement driven quantum key distribution is complete.

Figure 7A:
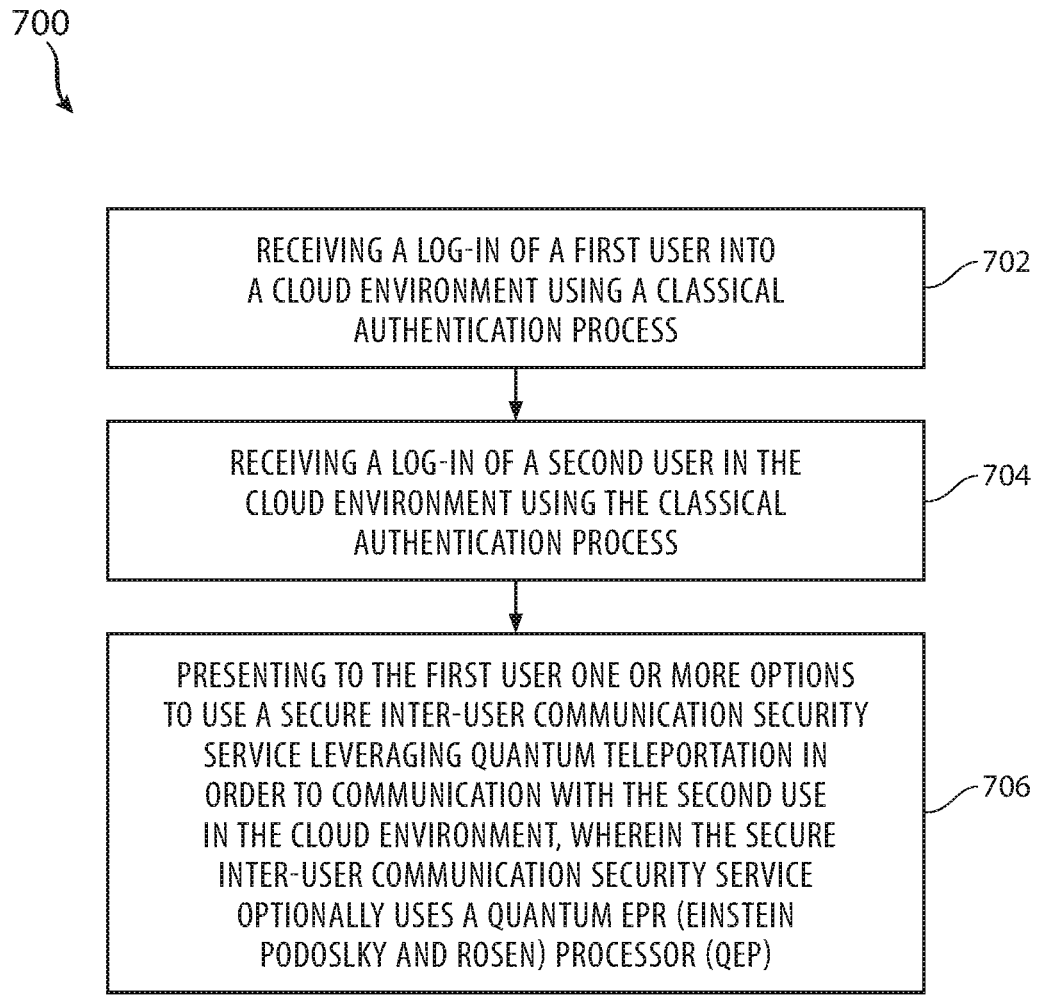
FIG. 7A illustrates a method embodiment, according to some aspects of this disclosure.

FIG. 7A illustrates a method 700 example of this disclosure. The method 700 can include receiving a log-in of a first user into a cloud environment using a classical authentication process (702), receiving a log-in of a second user in the cloud environment using the classical authentication process (704) and presenting to the first user one or more options to use a secure inter-user communication security service leveraging quantum teleportation in order to communication with the second user in the cloud environment, wherein the secure inter-user communication security service optionally uses a quantum EPR (Einstein Podolsky and Rosen) processor (QEP) (706). The one or more options can include a first option of applying the secure inter-user communication security service, a second option of applying the secure inter-user communication security service using QEP to generate EPR. Bell state pairs and applying robust additional security via quantum teleportation for communications between the first user and the second user within the cloud environment and a third option of applying the secure inter-user communication security service to securely control communication between a first container associated with the first user and a second container associated with the second user and running on the cloud environment and associated daemons leveraging the QEP.

In one aspect, the communications are made between a container daemon which receives access requests and processes the secure key pair generated by the QEP and grants access to respective users to be able to communicate with other users. A daemon is a program that runs continuously and exists for the purpose of handling periodic service requests that a computer stem expects to receive. The daemon program forwards the requests to other programs (or processes) as appropriate. In this case, itis a container daemon in a cloud computing environment that can process the requests associated with a more secure communication between users in the (public) cloud environment.

The quantum teleportation can be implemented using a butterfly topology as is shown in FIG. 2. The butterfly topology can be applied with a Greenberger Home Zeilinger state entanglement. Furthermore, the butterfly topology 200 can be further applied using probabilistic cloning properties of quantum states as outlined in the algorithm shown in FIG. 6.

Applying the robust additional security via quantum teleportation for communications between the first user and the second user within the cloud environment further an include implementing a query process from the first user to the second user for quantum key distribution of a secure key pair generated by the QEP and implementing an identify authentication process between the first user and the second user using the secure key pair generated by the QEP.

Applying the robust additional security via quantum teleportation for communications between the first user and the second user within the cloud environment further can include receiving, at a node in a network, a route request from the first user to connect a source node associated with the first user with a destination node associated with the second user, broadcasting, via at least the node in the network, the route request to other nodes in the network, performing, at the node and the other nodes in the network, a routing lookup and generating routing tables to establish a path to the source node, establishing an entangled channel connecting the source node to the destination node and teleporting qubit information from the source node to the destination node. These are features referenced in FIG. 5.

The route request can include an entanglement request to connect a first node associated with the first user to a second node associated with the second user. The step of implementing an identify authentication process between the first user and the second user using the secure key pair generated by the QEP 120 further can include applying a probability value when determining whether a prepared state and a measurement basis associated with the secure key pair are different to verify the second user.

An example system includes a processor and a computer-readable storage device storing instructions which, when executed by the processor, causes the processor to perform operations including one or more of receiving a log-in of a first user into a cloud environment using a classical authentication process, receiving a log-in of a second user in the cloud environment using the classical authentication process and presenting to the first user one or more options to use a secure inter-user communication security service leveraging quantum teleportation in order to communication with the second user in the cloud environment, wherein the secure inter-user communication security service optionally uses a quantum EPR (Einstein Podolsky and Rosen) processor (QEP). The one or more options include a first option of applying the secure inter-user communication security service, a second option of applying the secure inter-user communication security service using QEP to generate EPR Bell state pairs and applying robust additional security via quantum teleportation for communications between the first user and the second user within the cloud environment and a third option of applying the secure inter-user communication security service to securely control communication between a first container associated with the first user and a second container associated with the second user and running on the cloud environment and associated daemons leveraging the QEP.

The quantum teleportation can be implemented using a butterfly topology and applying a separable ancilla qubit. The butterfly topology can be applied with a Greenberger Home Zeilinger state entanglement. In another aspect, the butterfly topology can be further applied using probabilistic cloning properties of quantum states.

The step of applying the robust additional security via quantum teleportation for communications between the first user and the second user within the cloud environment further can include implementing a query process from the first user to the second user for quantum key distribution of a secure key pair generated by the QEP and implementing an identify authentication process between the first user and the second user using the secure key pair generated by the QEP.

The robust additional security via quantum teleportation for communications between the first user and the second user within the cloud environment further can include receiving, at a node in a network, a route request from the first user to connect a source node associated with the first user with a destination node associated with the second user, broadcasting, via at least the node in the network, the route request to other nodes in the network, performing, at the node and the other nodes in the network, a routing lookup and generating routing tables to establish a path to the source node, establishing an entangled channel connecting the source node to the destination node and teleporting qubit information from the source node to the destination node.

The route request can include an entanglement request to connect a first node associated with the first user to a second node associated with the second user. The step of implementing an identify authentication process between the first user and the second user using the secure key pair generated by the QEP further can include applying a probability value when determining whether a prepared state and a measurement basis associated with the secure key pair are different to verify the second user.

Figure 7B:
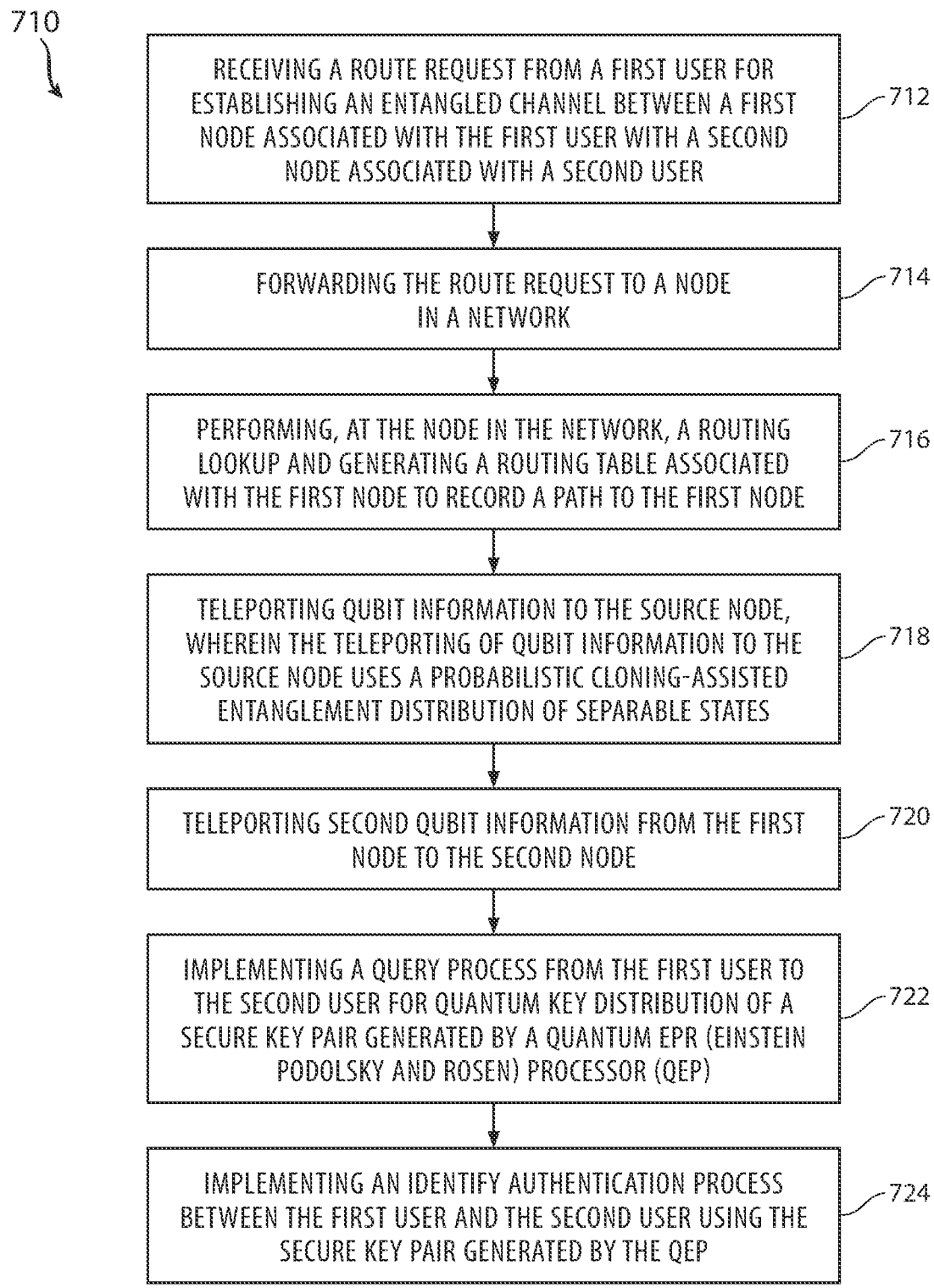
FIG. 7B illustrates another method embodiment, according to some aspects of this disclosure.

FIG. 7B illustrates a method 710 which can include one or more of receiving a route request from a first user for establishing an entangled channel between a first node associated with the first user with a second node associated with a second user (712), forwarding the route request to a node in a network (714), performing, at the node in the network, a routing lookup and generating a routing table associated with the first node to record a path to the first node (716) and teleporting qubit information to the source node, wherein the teleporting of qubit information to the source node uses a probabilistic cloning-assisted entanglement distribution of separable states (718). The method further can include teleporting second qubit information from the first node to the second node (720).

Teleporting the qubit information to the source node can be further achieved using a butterfly topology, wherein the butterfly topology is boosted with Greenberger-Horne-Zeilinger state entanglement and probabilistic cloning properties of quantum states.

The method further can include implementing a query process from the first user to the second user for quantum key distribution of a secure key pair generated by a quantum EPR (Einstein Podolsky and Rosen) processor (QEP) (722) and implementing an identify authentication process between the first user and the second user using the secure key pair generated by the QEP (724).

Figure 8:
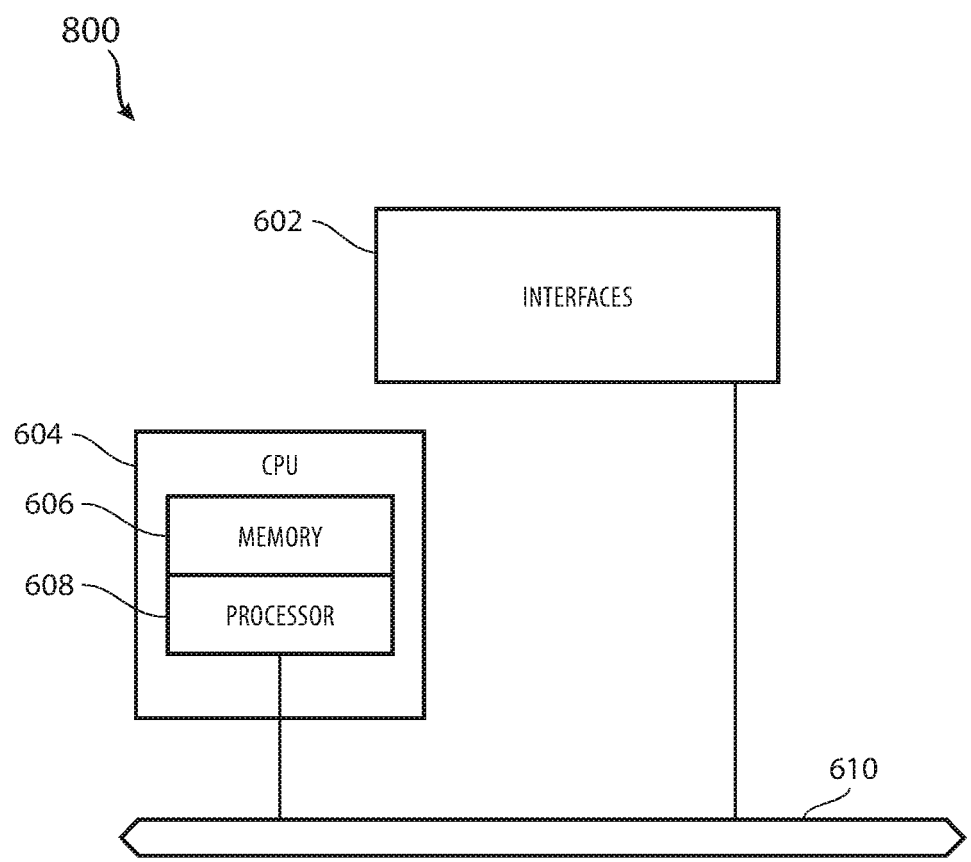
FIG. 8 illustrates an example network device in accordance with various examples.

FIG. 8 illustrates an example network device 800 suitable for implementing aspects of this disclosure. The network device 800 includes a central processing unit (CPU) 804, interfaces 802, and a connection 810 (e.g., a PCI bus). When acting under the control of appropriate software or firmware, the CPU 804 is responsible for executing packet management, error detection, and/or routing functions. The CPU 804 preferably accomplishes all these functions under the control of software including an operating system and any appropriate applications software. The CPU 804 may include one or more processors 808, such as a processor from the INTEL X86 family of microprocessors. In some cases, processor 808 can be specially designed hardware for controlling the operations of the network device 800. In some cases, a memory 806 (e.g., non-volatile RAM, ROM, etc.) also forms part of the CPU 804. However, there are many different ways in which memory could be coupled to the system.

The interfaces 802 are typically provided as modular interface cards (sometimes referred to as "line cards"). Generally, they control the sending and receiving of data packets over the network and sometimes support other peripherals used with the network device 800. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WiFi interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the CPU 804 to efficiently perform routing computations, network diagnostics, security functions, etc.

Although the system shown in FIG. 8 is one specific network device of the present technologies, it is by no means the only network device architecture on which the present technologies can be implemented. For example, an architecture having a single processor that handles communications as well as routing computations, etc., is often used. Further, other types of interfaces and media could also be used with the network device 800.

Regardless of the network device's configuration, it may employ one or more memories or memory modules (including memory 806) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. The memory 806 could also hold various software containers and virtualized execution environments and data.

The network device 800 can also include an application-specific integrated circuit (ASIC), which can be configured to perform routing and/or switching operations. The ASIC can communicate with other components in the network device 800 via the connection 810, to exchange data and signals and coordinate various types of operations by the network device 800, such as routing, switching, and/or data storage operations, for example.

Figure 9:
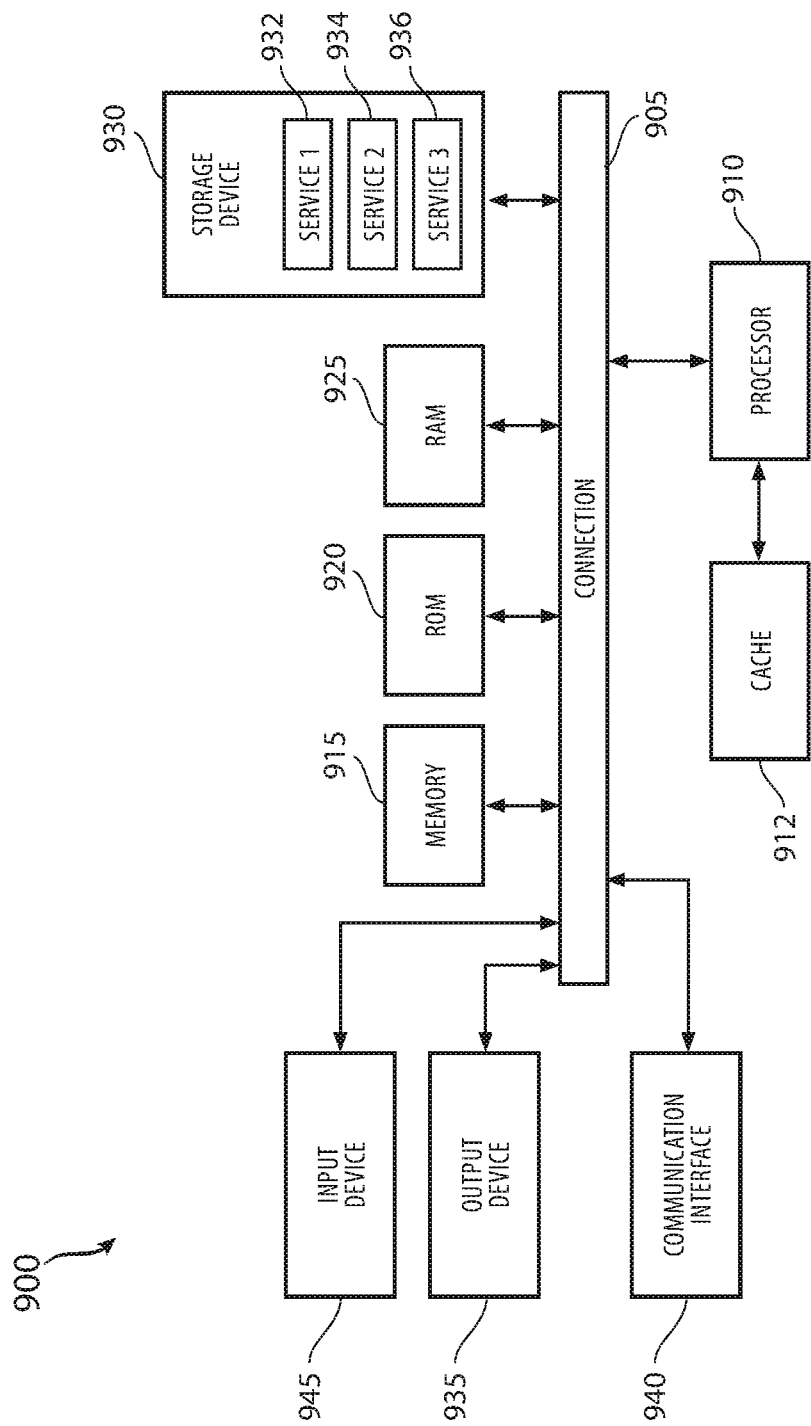
FIG. 9 illustrates an example computing device architecture, in accordance with some examples.

FIG. 9 illustrates an example computing device architecture 900 of an example computing device which can implement the various techniques described herein. The components of the computing device architecture 900 are shown in electrical communication with each other using a connection 905, such as a bus. The example computing device architecture 900 includes a processing unit (CPU or processor) 910 and a computing device connection 905 that couples various computing device components including the computing device memory 915, such as read only memory (ROM) 920 and random access memory (RAM) 925, to the processor 910.

The computing device architecture 900 can include a cache of high-speed memory connected directly with, in close proximity to, or integrated as part of the processor 910. The computing device architecture 900 can copy data from the memory 915 and/or the storage device 930 to the cache 912 for quick access by the processor 910. In this way, the cache can provide a performance boost that avoids processor 910 delays while waiting for data. These and other modules can control or be configured to control the processor 910 to perform various actions. Other computing device memory 915 may be available for use as well. The memory 915 can include multiple different types of memory with different performance characteristics. The processor 910 can include any general purpose processor and a hardware or software service, such as service 1 932, service 2 934, and service 3 936 stored in storage device 930, configured to control the processor 910 as well as a special-purpose processor where software instructions are incorporated into the processor design. The processor 910 may be a self-contained system, containing multiple cores or processors, a bus, memory controller, cache, etc. A multi-core processor may be symmetric or asymmetric.

To enable user interaction with the computing device architecture 900, an input device 945 can represent any number of input mechanisms, such as a microphone for speech, a touch-sensitive screen for gesture or graphical input, keyboard, mouse, motion input, speech and so forth. An output device 935 can also be one or more of a number of output mechanisms known to those of skill in the art, such as a display, projector, television, speaker device, etc. In some instances, multimodal computing devices can enable a user to provide multiple types of input to communicate with the computing device architecture 900. The communications interface 940 can generally govern and manage the user input and computing device output. There is no restriction on operating on any particular hardware arrangement and therefore the basic features here may easily be substituted for improved hardware or firmware arrangements as they are developed.

Storage device 930 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 925, read only memory (ROM) 920, and hybrids thereof. The storage device 930 can include services 932, 934, 936 for controlling the processor 910. Other hardware or software modules are contemplated. The storage device 930 can be connected to the computing device connection 905. In one aspect, a hardware module that performs a particular function can include the software component stored in a computer-readable medium in connection with the necessary hardware components, such as the processor 910, connection 905, output device 935, and so forth, to carry out the function.

For clarity of explanation, in some instances the present technology may be presented as including individual functional blocks including functional blocks including devices, device components, steps or routines in a method embodied in software, or combinations of hardware and software.

The present disclosure provides a proposed BFD low bandwidth implementation which can reduce the BFD overhead buy as much as 50% which would provide a large gain for SDWAN (software-defined networking in a wide-area network) customers.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

What is claimed is:

1. A method comprising:
receiving a log-in of a first user into a cloud environment using a classical authentication process;
receiving a log-in of a second user in the cloud environment using the classical authentication process;
presenting to the first user one or more options to use a secure inter-user communication security service leveraging quantum teleportation in order to communication with the second user in the cloud environment, wherein the secure inter-user communication security service optionally uses a quantum EPR (Einstein Podolsky and Rosen) processor (QEP), wherein the one or more options comprise:
a first option of applying the secure inter-user communication security service;
a second option of applying the secure inter-user communication security service using QEP to generate EPR Bell state pairs and applying robust additional security via quantum teleportation for communications between the first user and the second user within the cloud environment; and
a third option of applying the secure inter-user communication security service to securely control communication between a first container associated with the first user and a second container associated with the second user and running on the cloud environment and associated daemons leveraging the QEP.

2. The method of claim 1, wherein the quantum teleportation is implemented using a butterfly topology and applying a separable ancilla qubit.

3. The method of claim 2, wherein the butterfly topology is applied with a Greenberger Home Zeilinger state entanglement.

4. The method of claim 3, wherein the butterfly topology is further applied using probabilistic cloning properties of quantum states.

5. The method of claim 4, wherein applying the robust additional security via quantum teleportation for communications between the first user and the second user within the cloud environment further comprises:
implementing a query process from the first user to the second user for quantum key distribution of a secure key pair generated by the QEP; and
implementing an identify authentication process between the first user and the second user using the secure key pair generated by the QEP.

6. The method of claim 5, wherein implementing an identify authentication process between the first user and the second user using the secure key pair generated by the QEP further comprises applying a probability value when determining whether a prepared state and a measurement basis associated with the secure key pair are different to verify the second user.

7. The method of claim 4, applying the robust additional security via quantum teleportation for communications between the first user and the second user within the cloud environment further comprises:
receiving, at a node in a network, a route request from the first user to connect a source node associated with the first user with a destination node associated with the second user;
broadcasting, via at least the node in the network, the route request to other nodes in the network;
performing, at the node and the other nodes in the network, a routing lookup and generating routing tables to establish a path to the source node;
establishing an entangled channel connecting the source node to the destination node; and
teleporting qubit information from the source node to the destination node.

8. The method of claim 7, wherein the route request comprises an entanglement request to connect a first node associated with the first user to a second node associated with the second user.

9. A system comprising:
a processor; and
a computer-readable storage device storing instructions which, when executed by the processor, causes the processor to perform operations comprising:
receiving a log-in of a first user into a cloud environment using a classical authentication process;
receiving a log-in of a second user in the cloud environment using the classical authentication process;
presenting to the first user one or more options to use a secure inter-user communication security service leveraging quantum teleportation in order to communication with the second user in the cloud environment, wherein the secure inter-user communication security service optionally uses a quantum EPR (Einstein Podolsky and Rosen) processor (QEP), wherein the one or more options comprise:
a first option of applying the secure inter-user communication security service;
a second option of applying the secure inter-user communication security service using QEP to generate EPR Bell state pairs and applying robust additional security via quantum teleportation for communications between the first user and the second user within the cloud environment; and
a third option of applying the secure inter-user communication security service to securely control communication between a first container associated with the first user and a second container associated with the second user and running on the cloud environment and associated daemons leveraging the QEP.

10. The system of claim 9, wherein the quantum teleportation is implemented using a butterfly topology and applying a separable ancilla qubit.

11. The system of claim 10, wherein the butterfly topology is applied with a Greenberger Home Zeilinger state entanglement.

12. The system of claim 11, wherein the butterfly topology is further applied using probabilistic cloning properties of quantum states.

13. The system of claim 12, wherein applying the robust additional security via quantum teleportation for communications between the first user and the second user within the cloud environment further comprises:
implementing a query process from the first user to the second user for quantum key distribution of a secure key pair generated by the QEP; and implementing an identify authentication process between the first user and the second user using the secure key pair generated by the QEP.

14. The system of claim 13, wherein implementing an identify authentication process between the first user and the second user using the secure key pair generated by the QEP further comprises applying a probability value when determining whether a prepared state and a measurement basis associated with the secure key pair are different to verify the second user.

15. The system of claim 12, applying the robust additional security via quantum teleportation for communications between the first user and the second user within the cloud environment further comprises:
- receiving, at a node in a network, a route request from the first user to connect a source node associated with the first user with a destination node associated with the second user;
- broadcasting, via at least the node in the network, the route request to other nodes in the network;
- performing, at the node and the other nodes in the network, a routing lookup and generating routing tables to establish a path to the source node;
- establishing an entangled channel connecting the source node to the destination node; and
- teleporting qubit information from the source node to the destination node.

16. The system of claim 15, wherein the route request comprises an entanglement request to connect a first node associated with the first user to a second node associated with the second user.

17. A method comprising:
- receiving a route request from a first user for establishing an entangled channel between a first node associated with the first user with a second node associated with a second user;
- forwarding the route request to a node in a network;
- performing, at the node in the network, a routing lookup and generating a routing table associated with the first node to record a path to the first node; and
- teleporting qubit information to the source node, wherein the teleporting of qubit information to the source node uses a probabilistic cloning-assisted entanglement distribution of separable states.

18. The method of claim 17, wherein the method further comprises:
- teleporting second qubit information from the first node to the second node.

19. The method of claim 17, wherein teleporting the qubit information to the source node is further achieved using a butterfly topology, wherein the butterfly topology is boosted with Greenberger-Horne-Zeilinger state entanglement and probabilistic cloning properties of quantum states.

20. The method of claim 17, wherein the method further comprises:
- implementing a query process from the first user to the second user for quantum key distribution of a secure key pair generated by a quantum EPR (Einstein Podolsky and Rosen) processor (QEP); and
- implementing an identify authentication process between the first user and the second user using the secure key pair generated by the QEP.

* * * * *